United States Patent
Logan

(10) Patent No.: US 10,862,891 B2
(45) Date of Patent: Dec. 8, 2020

(54) COMMUNICATION TRACKING SYSTEM FOR CORRECTIONAL FACILITIES

(71) Applicant: HLFIP HOLDING, INC., Largo, FL (US)

(72) Inventor: Jonathan D Logan, Tampa, FL (US)

(73) Assignee: HLFIP HOLDING, INC., Largo, FL (US)

( * ) Notice: Subject to any disclaimer, the term of this patent is extended or adjusted under 35 U.S.C. 154(b) by 0 days.

(21) Appl. No.: 16/529,745

(22) Filed: Aug. 1, 2019

(65) Prior Publication Data
US 2019/0386996 A1 Dec. 19, 2019

Related U.S. Application Data

(63) Continuation-in-part of application No. 16/409,084, filed on May 10, 2019, which is a continuation of application No. 15/153,171, filed on May 12, 2016, now Pat. No. 10,291,617.

(60) Provisional application No. 62/713,337, filed on Aug. 1, 2018, provisional application No. 62/286,046, filed on Jan. 22, 2016, provisional application No. 62/160,054, filed on May 12, 2015.

(51) Int. Cl.
*H04L 29/06* (2006.01)
*H04L 12/58* (2006.01)
*G06K 9/34* (2006.01)
*G06K 9/00* (2006.01)

(52) U.S. Cl.
CPC .......... *H04L 63/10* (2013.01); *G06K 9/00442* (2013.01); *G06K 9/344* (2013.01); *H04L 51/08* (2013.01); *H04L 51/12* (2013.01); *H04L 63/0245* (2013.01)

(58) Field of Classification Search
USPC ............................................................ 726/4
See application file for complete search history.

(56) References Cited

U.S. PATENT DOCUMENTS

| | | | |
|---|---|---|---|
| 5,917,925 | A | 6/1999 | Moore |
| 6,285,777 | B2 | 9/2001 | Kanevsky et al. |
| 6,463,127 | B1 | 10/2002 | Maier et al. |

(Continued)

OTHER PUBLICATIONS

6 Services to Send and Receive Snail Mail Through the Web; http://www.instantfundas.com/2008/04/6-services-to-send-and-receive-snail.html 12/3112008, 1 page.

(Continued)

*Primary Examiner* — Brandon S Hoffman
*Assistant Examiner* — Nega Woldemariam
(74) *Attorney, Agent, or Firm* — Shah IP Law, PLLC

(57) ABSTRACT

The present disclosure is for a system and a method for tracking physical and digital communication that is sent to an inmate who is incarcerated in a correction facility. The present invention enables a significant reduction in contraband and/or prohibited communication that is sent to inmates, and, at the same time, provides transparency in the communication delivery process such that a sender is appraised as to the status of the communication as it is processed by various systems and sub-systems within a correctional facility. Moreover, the present invention enables the identification and detection of criminal or prohibited communication that would otherwise have been undetected using prior art systems.

18 Claims, 25 Drawing Sheets

(56) References Cited

U.S. PATENT DOCUMENTS

| | | | |
|---|---|---|---|
| 6,513,003 B1 | 1/2003 | Angell et al. | |
| 6,609,196 B1 | 8/2003 | Dickinson, III et al. | |
| 6,668,045 B1 | 12/2003 | Mow | |
| 7,161,108 B2 | 1/2007 | Connell et al. | |
| 7,502,451 B2 | 3/2009 | Gyllenskog et al. | |
| 7,693,942 B2 | 4/2010 | Nale | |
| 7,742,581 B2 | 6/2010 | Hodge et al. | |
| 7,804,941 B2 | 9/2010 | Keiser et al. | |
| 8,204,177 B2 | 6/2012 | Harper | |
| 8,331,677 B2 | 12/2012 | Foehr et al. | |
| 8,588,528 B2 | 11/2013 | Chapman et al. | |
| 8,676,273 B1* | 3/2014 | Fujisaki | H04M 1/6505 455/567 |
| 9,178,862 B1 | 11/2015 | Daniel | |
| 9,311,627 B1* | 4/2016 | Shipman, Jr. | G06Q 10/107 |
| 9,525,656 B2 | 12/2016 | Harper | |
| 9,742,935 B1 | 8/2017 | Shipman, Jr. et al. | |
| 2002/0056123 A1* | 5/2002 | Liwerant | H04M 3/567 725/87 |
| 2003/0072469 A1 | 4/2003 | Alden | |
| 2003/0074477 A1 | 4/2003 | Fukushima et al. | |
| 2003/0177115 A1 | 9/2003 | Stern et al. | |
| 2005/0018214 A1 | 1/2005 | Dewitt et al. | |
| 2006/0031086 A1 | 2/2006 | Miles et al. | |
| 2006/0218188 A1 | 9/2006 | Duncan et al. | |
| 2006/0245559 A1* | 11/2006 | Hodge | H04L 51/066 379/88.19 |
| 2007/0226088 A1 | 9/2007 | Miles et al. | |
| 2007/0233610 A1 | 10/2007 | Gyllenskog et al. | |
| 2008/0040781 A1* | 2/2008 | Keiser | H04L 51/066 726/5 |
| 2009/0052804 A1 | 2/2009 | Lewis | |
| 2009/0282009 A1 | 11/2009 | Levey et al. | |
| 2010/0299761 A1 | 11/2010 | Shapiro | |
| 2011/0119730 A1 | 5/2011 | Eldar et al. | |
| 2012/0266219 A1 | 10/2012 | Coleman et al. | |
| 2013/0179949 A1* | 7/2013 | Shapiro | H04L 51/12 726/4 |
| 2013/0226678 A1 | 8/2013 | Perna | |
| 2013/0246158 A1 | 9/2013 | Cannon et al. | |
| 2014/0006148 A1 | 1/2014 | Perna | |
| 2014/0136628 A1 | 5/2014 | Davis, Jr. et al. | |
| 2014/0229558 A1 | 8/2014 | Ricci | |
| 2015/0172292 A1* | 6/2015 | Kuang | H04L 63/0884 713/155 |
| 2015/0215254 A1* | 7/2015 | Bennett | H04L 51/12 709/206 |
| 2015/0373031 A1 | 12/2015 | Hockings et al. | |
| 2016/0337360 A1 | 11/2016 | Logan | |

OTHER PUBLICATIONS

Armstrong et al., Digital System, Evidence and Forensics Issues in Correctional Environments, 2010 IEEE, 9 pages (Year: 2010).

Bisson et al., Methods for the Prevention of the Use of Mobile Phones in Correctional Institutions, 2012 Crown, 9 pages (Year: 2012).

Dhanalakshmi etal., An Intelligent Technique to Detect File Formats and Email Spam, 2010 India, 6 pages (Year: 2010).

Finland postal service to open mail and send scanned email copies, Telegraph Media Group Limited 2019, https://www.telegraph.co.uk/news/worldnews/europe/finland/7545709/Finland-postal-service-to--Open-mail-and-send-scanned-mail-copies.html, UK, 2 pages.

Gregory Gearhart, Controlling Contraband, 2006 CT Feature, 3 pages (Year: 2006).

Mailbox Forwarding—View Postal Mail Online, Mail Forwarding, Mailbox Rental, and Virtual Office PO Box Services, Feb. 26, 2019, https://www.smartjailmail.com/, SmartJailMail.com.

Micheal L. Stern, Prison Mail Censorship: A Non-constitutional Analysis, 1972 HeinOnline, 47 pages (Year: 1972).

* cited by examiner

Step 1 – Locate Inmate

To process mail, enter the inmate's ID number or last name. This will search the inmate roster for active inmates that we can process mail for. The inmate's name and ID should match the received mail and the location should match the appropriate PO Box that the mail was delivered to. If no active inmate is found the inactive accounts will be searched as well. If the inmate is not active or cannot be found the mail should be left unopened and marked to "return to sender" and returned.

Search
Location: -- All Locations --
ID or Last Name:

[Search] [Hide]

FIG. 5

Step 2 – Select or Enter Sender

To: CHRISTINA BAILEY (852285) at FL-Martin County Jail

Select the sender from the inmate's contacts below or enter the sender name, company name, etc. or enter "unknown" if sender is not available.

| Name | Location | Gender |
|---|---|---|
| RULEY, GEORGE | Sarasota, FL 34241 | Male |

Sender Name: [ ]

[ Proceed... ]

FIG. 7

Step 3 – Scan Mail

To: CHRISTINA BAILEY (352285) at FL-Martin County Jail

Please verify that the inmate information above is correct before proceeding. If the information matches the mail recipient please proceed with the scanning process. Once the scan is complete, click "refresh" below to show the scan file.

Scanned File
EF39C21D-B679-A62D-7499F8CBE6C6DF8D.pdf
Preview Scan...

Postal Mail Addresses

This facility is now processing postal mail through a Mail Processing Center. Regular postal mail will be received at an off-site facility, scanned into an electronic format, and then delivered to you through this kiosk. Privileged mail from attorneys and larger parcels such as books, magazines, or other approved materials can be sent directly to the jail at the address below. All other mail should be sent to the Smart Communications Mail Processing Center. Regular postal mail received at the facility will be rejected and returned.

Privileged Attorney Correspondence

NOTE: Privileged mail from your attorney must be clearly marked as such.

> Sample County Jail
> ATTN: Jacket #12345
> 321 County Rd.
> Somewheresville, FL 34241

Books, Magazines, and Other Approved Parcels (See Inmate Handbook)

> Sample County Jail
> ATTN: Jacket #12345
> 321 County Rd.
> Somewheresville, FL 34241

All Other Mail, Personal Mail, Postcards, Letters, etc.

> Inmate Name #12345
> c/o Mail Processing Center
> 5406 Airport Rd.
> Tampa, FL 33609

Return to My Postal Mail

COMMUNICATION TRACKING SYSTEM FOR CORRECTIONAL FACILITIES

CROSS-REFERENCE TO RELATED APPLICATIONS

This application claims priority to U.S. Provisional Patent Application Ser. No. 62/713,337, filed Aug. 1, 2018 entitled "Correctional Postal Mail System and Method." The entire content of that application is incorporated herein by reference.

This application is also a continuation-in-part of U.S. Non-Provisional patent application Ser. No. 16/409,084, filed May 10, 2019 entitled "Correctional Postal Mail Contraband Elimination System," which is a continuation of U.S. Non-Provisional patent application Ser. No. 15/153,171, filed May 12, 2016 entitled "Correctional Postal Mail Contraband Elimination System." Both applications claim priority to U.S. Provisional Patent Application Ser. No. 62/286,046, filed Jan. 22, 2016 entitled "Correctional Postal Mail Contraband Elimination Systems" and U.S. Provisional Patent Application Ser. No. 62/160,054, filed May 12, 2015 entitled "Correctional Postal Mail Contraband Elimination Systems." The entire content of these applications is incorporated herein by reference.

BACKGROUND

Field of the Art

This disclosure relates to systems and methods for identifying contraband in communications to inmates who are incarcerated in a correctional facility. More specifically, the present disclosure relates to identifying contraband in physical and/or digital communication that is sent to an inmate.

Discussion of the State of the Art

Digitizing postal mail that is sent to inmates in a correctional facility is well known. One benefit of delivering digitized copies of postal mail to inmates is the elimination of physical contraband that may otherwise accompany or be hidden in postal mail items. Despite this benefit, digital mail delivery is not widely embraced by correctional facilities because of the added challenges and complexity that are introduced by digitizing postal mail. For example, correctional facilities typically need to review communications for physical contraband, and perform an additional step of digitizing the communication. Moreover, digitized communication, unlike traditional postal communication, is much more difficult to track because both the digitized communication, and the underlying communication typically must be tracked. Moreover, if communication to an inmate is bifurcated between underlying communication and digitized communication, it is generally much more difficult to provide transparency to the sender about the status of the communication as it is processed through a correctional facility.

In addition to these challenges, the advent of digital communication, such as email, etc., has significantly proliferated the amount of communication that is sent to inmates. The additional communication has raised new concerns about digital communication that is sent to inmates including prohibited digital materials that may be sent to inmates, and has placed additional stress on traditional review mechanism, which are generally unable to keep up with the volume of digital communication. Currently available systems are unable to address these challenges while providing transparency to the sender and ensuring that prohibited or contraband communication is prevented from reaching an inmate.

SUMMARY

The present invention is for a mail tracking system that tracks communication that is sent to an inmate who is incarcerated in a correctional facility. The invention permits the sender to obtain updates about the status of his or her communication and thereby improves user experience. Moreover, the present invention enables removal of contraband and other criminal communication that may otherwise be present in these communications.

More specifically, the present invention is for a computer-implemented method comprising obtaining digital mail data associated with a communication sent to an inmate by a sender, determining whether the sender is associated with a sender ID, providing registration information to the sender if the sender is not associated with a sender ID, wherein the registration information enables a sender to register for a mail-tracking system and receive updates regarding the communication, obtaining a sender information check when the sender registers for the mail-tracking system, the sender information provided by the sender to register for the mail-tracking system, collecting sender data when the sender registers for the mail-tracking system, generating sender ID that is associated with the sender once the sender has registered for the mail-tracking system, associating the obtained digital mail data with the verified sender ID once it is made available, obtaining contraband analysis on the communication, flagging the digital mail data if the obtained contraband analysis indicates that the communication is comprised of contraband, updating the mail-tracking system, wherein the sender is enabled to track the status of the communication by logging into the mail-tracking system with credentials associated with the sender ID, and collecting sender data when the sender logs into the mail-tracking system with credentials associated with the sender ID.

In one embodiment, the digital mail data is comprised of one or more digital files representing physical communication, digital communication and/or communication sent via postal mail.

In one embodiment of the invention, a variety of data on the sender may be collected when the sender registers for the mail-tracking system, including, but not limited to an IP address associated with the computing device used by the sender, location data associated with the computing device used by the sender.

In one embodiment, the method is comprised of obtaining sender information check, which may be comprised of obtaining a local check from an application on the computing device used by the sender, wherein the local check is performed to detect completeness of the sender provided address and to ensure compliance with convention. The sender information check may be comprised of verifying the sender provided information against information obtained from other databases.

In one embodiment, the method is comprised of obtaining a determination of whether the sender ID associated with the digital mail data is associated with sending contraband to an inmate.

In one embodiment, the method is further comprised of analyzing the content of the digital mail data. The content may be used to identifying repetition and/or a pattern in communication from the sender to one or more inmates, the repetition and/or pattern indicating that the communication is comprised of impermissible and/or criminal communication. In one embodiment, the contraband analysis is further comprised of identifying certain keywords in the content of the communication between the sender and the inmate. In one embodiment, the method is comprised of identifying relationships between senders and inmates, the relationships based on communications patterns among various senders and inmates, and/or collected sender data that is collected when the sender registers, and/or collected sender data that is collected when the sender logs into the mail-tracking system with credentials associated with the sender ID In one embodiment, the mail-tracking system is updated when the digital mail data is made available to the inmate. In one embodiment, the sender is notified when the digital mail data representing communication sent by the sender.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIG. 5 illustrates a display that may conveniently be used in connection with steps illustrated in FIG. 4 and suitable for use in connection with certain embodiments of methods and systems according to the present invention;

FIG. 7 illustrates a display that may conveniently be used in connection with steps illustrated in FIG. 4 and suitable for use in connection with certain embodiments of methods and systems according to the present invention;

FIG. 9 illustrates a display that may conveniently be used in connection with steps illustrated in FIG. 4 and suitable for use in connection with certain embodiments of methods and systems according to the present invention;

FIG. 10 depicts a scanned item of postal mail that may conveniently be displayed in connection with steps illustrated in FIG. 4 and suitable for use in connection with certain embodiments of methods and systems according to the present invention;

FIG. 14 illustrates a second display that may conveniently be used by inmates in a correctional facility and suitable for use in connection with certain embodiments of methods and systems according to the present invention;

FIG. 16 illustrates a display that may conveniently be used by staff in a correctional facility or investigators and suitable for use in connection with certain embodiments of methods and systems according to the present invention;

DETAILED DESCRIPTION

Figure 1:
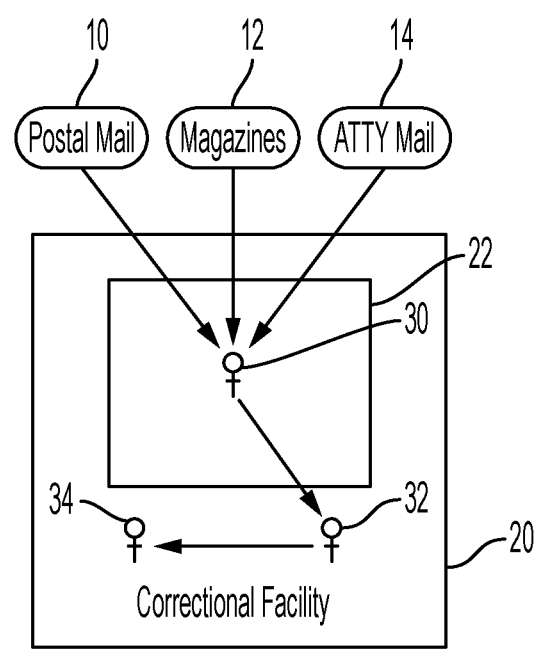
FIG. 1 illustrates a block diagram of the manual method of delivering postal mail to inmates in a correctional institution.

Reference will now be made in detail to the embodiments of the presently disclosed invention, features of which are illustrated in the accompanying drawings.

The inventive system and method (hereinafter sometimes referred to more simply as "system" or "method") described herein significantly reduces the computing resources, computing time, and costs associated with making predictions in a deployed machine learning system, regardless of whether the predictions are made using a deployed system or a cloud scoring API. Specifically, the inventive system stores certain predictions once they are made, processes the stored data, and uses stored predictions if newly requested predictions meet certain similarity criteria associated with the stored predictions. The inventive system described herein reduces the computing resources, computing time, and costs cost associated with making predictions in a dedicated, or shared/rented machine learning system environment.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Overview

Postal mail is a federal right to U.S. citizens incarcerated in a correctional agency within the United States. Traditionally, postal mail sent to an incarcerated individual is searched by hand and may be scanned through a contraband detection machine to detect for drugs, weapons, chemicals, and poison, and then hand delivered to the inmate. Stamps and stickers may also be removed as a further security measure. Either the inspected mail or a photocopy (for added security) is then delivered by facility personnel to the inmate. In some correctional agencies, postal mail sent to the facility is limited to only postcards in an effort to reduce administrative cost and handling time.

This manual process for processing postal mail is illustrated in FIG. 1. Magazines 12, Attorney Mail 14, and other Postal Mail 10 (jointly "mail") are received at correctional facility 20, and sent to an in-facility manual mail processing center 22. Facility mail processing staff 30 then review and process the mail to verify recipient inmates, identify contraband and illicit content, etc. Such contraband or illicit content may include pornography, dangerous objects or criminal communication. Reviewed mail determined to be appropriate for delivery is then delivered to recipient inmates 34 by facility delivery staff 32 (which may or may not be the same persons as facility mail processing staff 30).

Postal mail contraband sent to correctional facilities is a daily problem and security risk that every correctional agency must combat. Many manual processes such as those described in connection with FIG. 1 have been used to reduce the chances of contraband reaching the recipient inmates. These processes are labor intensive, expensive and time consuming for the staff of the correctional facility, and they delay mail delivery to the recipient. Although these steps help reduce the problem of the transmittal of contraband, they do not entirely eliminate contraband. Common practice to combat contraband in the postal mail including: hand searching each piece of mail; testing or scanning mail for drugs, chemicals, and poison; removing stamps, photos, and stickers; and making photocopies of mail to be hand delivered to an inmate instead of the original item that was mailed to facility.

One objective of the presently disclosed system and method is an application in which such problems are reduced by, where possible, delivering electronic copies to inmates as opposed to physical copies. In such an embodiment, contraband cannot reach the inmate because an electronic copy is made of the postal mail and that electronic copy transmitted to the inmate for viewing on a kiosk or portable device. The possibility of any contraband reaching the inmate is thereby eliminated for all practical purposes. In addition, because physical copies are not provided to the inmate, the processing required when postal mail 10 is received (such as removing stamps or analyzing for substances incorporated into the paper) can be reduced. A further benefit is that an electronic form of the postal mail is delivered electronically to the inmate without the correctional institution staff having to hand deliver the mail. Accordingly, in addition to reducing contraband risk, certain embodiments may include the benefits of reducing manual labor, reducing staff and inmate interaction, and reducing foot traffic inside the facility, all of which can be benefits in a correctional environment.

Furthermore, often with postal mail, there is no record of the piece of mail once it has been delivered to the inmate, unless a copy was made and saved by the prison's staff. Where copies are made, such copies are most often physical copies and are hard to search or for outside investigators to access. In certain embodiments of the present invention, security is enhanced because every piece of postal mail 10 can be documented, saved electronically, and in many cases, made searchable for further review by prison staff and detectives, and may be linked to the specific inmate to whom the postal mail was addressed. Further, additional information, such as sender information, may be associated with the electronically saved mail. Specific sender information may then be linked or associated with individual inmates or groups of inmates. The association of sender information with specific inmates may allow for the discovery of trends or patterns of mail delivery to specific inmates, or by specific senders, or even to specific institutions or groups of institutions. Mail may thus be reviewed under an inmate's postal mail history on the system, in accordance with some embodiments. Mail thus may be also reviewed under a senders postal mail history on the system, in accordance with some embodiments.

It will also be understood that, when physical mail is to be delivered, the delivery is most often to the facility where the inmate is housed. This means that each such facility must separately implement the receiving and distribution procedures discussed above, often using institution staff that have other important responsibilities. Embodiments of the present invention allow multiple facilities to receive postal mail at a central location, thereby offering further opportunities for cost savings and security enhancement. Only magazines 12 and attorney mail 14 need to be physically delivered to the facility. Magazines 12 and attorney mail 14 typically require less processing, in part, because they are sent to the inmate by third parties other than friends, business associates and family members, and who are unlikely to attempt to deliver contraband to the inmate. The result is that only a smaller amount of comparatively low-risk mail need be processed by the institution staff, with the higher-volume, higher-risk postal mail 10 being processed by a centralized receiving center.

As is noted above, an advantage of some embodiments for the present invention may be a practically complete elimination of contraband in postal mail for the corrections industry.

Another benefit may be a system embodiment that delivers postal mail to inmates electronically, without staff having to hand deliver postal mail. A further benefit may be improved record keeping. Certain embodiments may thus improve agency security, reduce manual labor, and increase postal mail efficiency in correctional agencies.

While an inmate email system for inmates housed by correctional agencies can provide inmates a contraband-free written communication alternative to postal mail, such email systems do not combat contraband in postal mail. Even if email systems are provided, postal mail must also be allowed as a federal right to inmates. The introduction of email systems may have helped reduce postal mail volume being sent to correctional agencies, allowing the agency to focus on a smaller volume of postal mail that does come into the facility. However, email systems have not replaced postal mail and have not otherwise directly impacted postal mail handling.

Conventional email systems were merely introduced as an alternative to postal mail and were not meant to stop contraband in postal mail. Postal mail is thus still reaching inmates and still creates contraband issues for facilities. Because contraband is being sent in that postal mail, it is impossible to completely eliminate contraband reaching the inmate because not all of the transmitted contraband can be detected (for example, lacing letters with drugs or poison, or finding previously undiscovered ways of hiding hard-to-detect weapons in postal mail). Even with the current methods and technology in place, some mail with contraband may still pass through detection by both humans and technology.

In correctional facilities, inmate communications with the outside world are intentionally limited. Postal mail is the oldest form of communication in the corrections industry. Contraband being sent through postal mail has thus been a problem since the beginning of corrections hundreds of years ago, yet the same basic process is still used today and federal law has created a right for inmates to receive postal mail. Postal mail is sent into a correctional facility, and even though some inspection processes are in place, that postal mail traditionally gets hand delivered to the inmate the same way it was hundreds of years ago. Since the ability to receive postal mail is required by law and the corrections environment promotes limited controlled communication, any change as to how postal mail reaches inmates has been discouraged. As payment for the postal mail has already been made to the postal service, there has been no financial incentive for anyone to invest money or technology to improve the way inmates received their postal mail.

In order for inmates to be able to receive electronic copies of their postal mail, an investment is required to implement embodiments of the presently disclosed system and method. Since inmates may not be charged additional money for delivery of postal mail over and above the postal service fee, there has been no financial incentive for facility to invest this capital. The labor cost savings and the benefit of essentially eliminating the chance of any contraband reaching inmates through the mail, can justify an investment and can also result in further advantages such as reducing the carbon footprint of mail delivery, improving security throughout the country, reducing recidivism, lowering the cost of incarceration per inmate, and lowering the burden on tax payers across the country. Costs may still be seen as prohibitive if it is necessary to implement an electronic infrastructure to deliver scanned mail to inmates. However, in facilities where kiosks or portable devices are already in use by inmates for the purpose of providing other paid services (for example email or video visitation), the cost of implementing embodiments of the present invention are reduced and may also be offset by other revenue streams for the facility, resulting from other services delivered through such devices. In certain embodiments of methods according to the present disclosure, processing of postal mail IO by a third-party facility may be offered at little or no cost to the facility by a third-party kiosk or email vendor.

Figure 2:
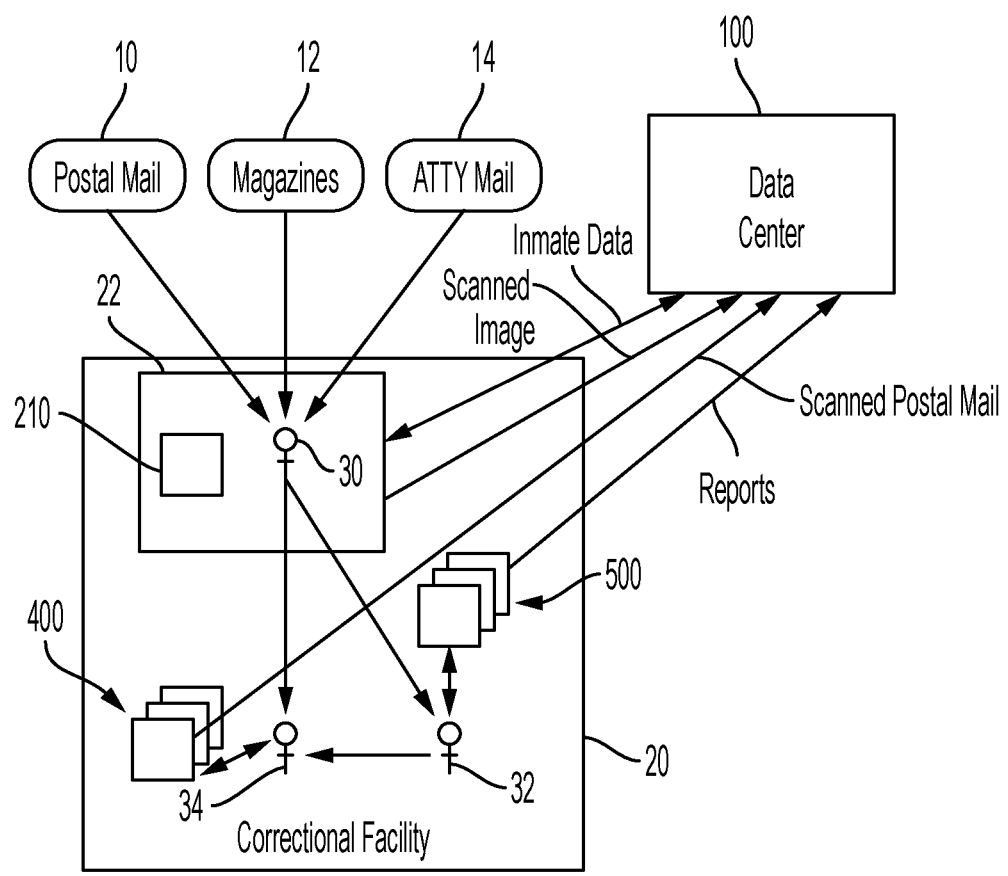
FIG. 2 illustrates a block diagram of an embodiment of a method and system, in accordance with certain embodiments of the invention, in which postal mail processing occurs within a correctional facility.

Embodiments of the presently disclosed invention thus enable postal mail that is sent to correctional facilities to be reduced to an electronic copy and delivered to the inmate electronically, thereby essentially eliminating the chance that mailed contraband will reach the inmate. FIG. 2 illustrates an embodiment according to the present disclosure that is implemented within a correctional facility 20, but using a remote or cloud-based data center 100. The postal mail 10 is received into in-facility manual mail processing center 200. Comparatively lower-risk magazines 12 and attorney mail 14 are processed and delivered by manual delivery. For other postal mail 10, the contents and the envelope may be loaded into a scanner station 210. In some alternative embodiments, where some institutions may only allow post cards to be sent to inmates, the post cards may be loaded into a scanner station. Scanner station 210 may comprise a computer or portable device connected to a scanner, or a camera, and capable of creating an electronic image of the postal mail 10, thereby reducing the postal mail to an electronic form. In some embodiments, the electronic form may come in multiple parts. For example, an envelope may be scanned thereby capturing the sender information and the recipient inmate information.

The contents of the envelope may then be scanned capturing the content information. The recipient inmate information may be used to associate the electronic image or version to an inmate email account or other inmate designation. Additionally, this information may be logged or stored. Additional information such as the date received, date scanned, or other related information may logged as well. High speed scanning technology may be used for high volume applications. The scanned image may be uploaded into a software system, and the software system may prompt the user (e.g. correctional agency staff) either before or after the scanning is performed for the inmate's identification. This may be the inmate's prison number, the inmate's name, or some other unique identifier. The inmate identifier may be entered by the facility staff 32 (e.g., by selection from a presented list), and the software system may then retrieve the inmate's account based on the identifier that was entered into the system. The staff or user may then confirm that the postal mail, in electronic form, has been sent to the correct inmate identified in the software system, which may conveniently be implemented in a local, remote, or cloud-based data center 100. The staff may also enter the postal mail sender information. In certain embodiments, redaction of obscene material may also be performed at this stage either electronically or prior to scanning. After scanning, the original may either be stored or destroyed according to the policies of the correctional facility 20 and any legal requirements.

Magazines 12 and attorney mail 14, which must be delivered to inmates 34 in physical form, (after any required processing or logging) are provided to other institution staff 32 for deliver to inmate 34. Postal mail 10, however, is delivered to inmates 34 through computer terminal 400, which may conveniently be a kiosk, such as is used to deliver email to inmates, a portable device such as a tablet or MP4 player, or a worn device used by inmates, or any other electronic device with a display capability and a network connection capability, by the system in data center 100. Where other institution staff 32 need to monitor electronically delivered postal mail for investigative or other appropriate reasons, workstations, computers, or portable devices 500 can access an institution staff interface implemented by the system hosted in data center 100.

Other intermediate steps may also take place in certain embodiments. In certain embodiments, once the mail processing staff 30 confirms the correct inmate as the recipient of the particular postal mail TO, and the staff submits the electronic form of the postal mail to the inmate's account, an electronic copy of the postal mail may be delivered electronically to the inmate's postal mail account via a computer terminal 400 (e.g. a kiosk within the correctional facility) wired or wireless, or via a computer terminal (not illustrated) located inside the inmate's housing unit, or on a wireless mobile device (e.g. a handheld tablet, smartphone, laptop, MP4 player, or worn device) not illustrated. The inmate may log into his or her account by access through the above mentioned devices in order to view the electronic copy of the postal mail 10, or may download a copy on a mobile device in order to view it, in the same manner that inmate email is delivered today, such as through an inmate email account, except that the delivery may be an image of the original (in a format such as PDF) instead of a text-only message. Optical character recognition of the scanned message (either as part of scanning or later) may be used to make the images text-searchable by institution staff, investigators or inmates, depending on the needs of the facility. Where handwriting is not susceptible to optical character recognition, manual transcription may be used either before or after the scanned image is made available to inmate 34.

All postal mail 10 may be memorialized in the system for each inmate, in accordance with certain embodiments. Mail processing staff 30 may upload and hold postal mail for review before it is released and thereby made accessible to the inmate. The staff 30 may reject postal mail so the inmate cannot view the postal mail even after it has been uploaded to the system. In some embodiments, the processing staff 30 and institution staff 32 may review, search, print, forward, add notes, flag, delete, each postal mail that has been uploaded to the system for each inmates account. Whereas attorney mail 14 may be delivered in physical form, without review by processing staff 30 or institution staff 32 to preserve confidentiality, other procedures may also be put in place for communications from legal counsel to ensure such communications remain private such as automated opening and scanning and flagging of the messages so that staff cannot access the images of them. Additionally, the electronic copies of certain postal mail may be flagged based on sender information or the discovery of contraband. For example, if a specific sender has repeatedly sent postal mail which contained contraband, any postal mail from that sender may be indicated for review by a flagging of the scanned copies. It is understood that a correctional institution may desire to flag scanned version of postal mail for any number of reasons to further tracking, investigation and review, and all of these reasons are considered within the scope of the exemplary embodiments disclosed.

Figure 3:
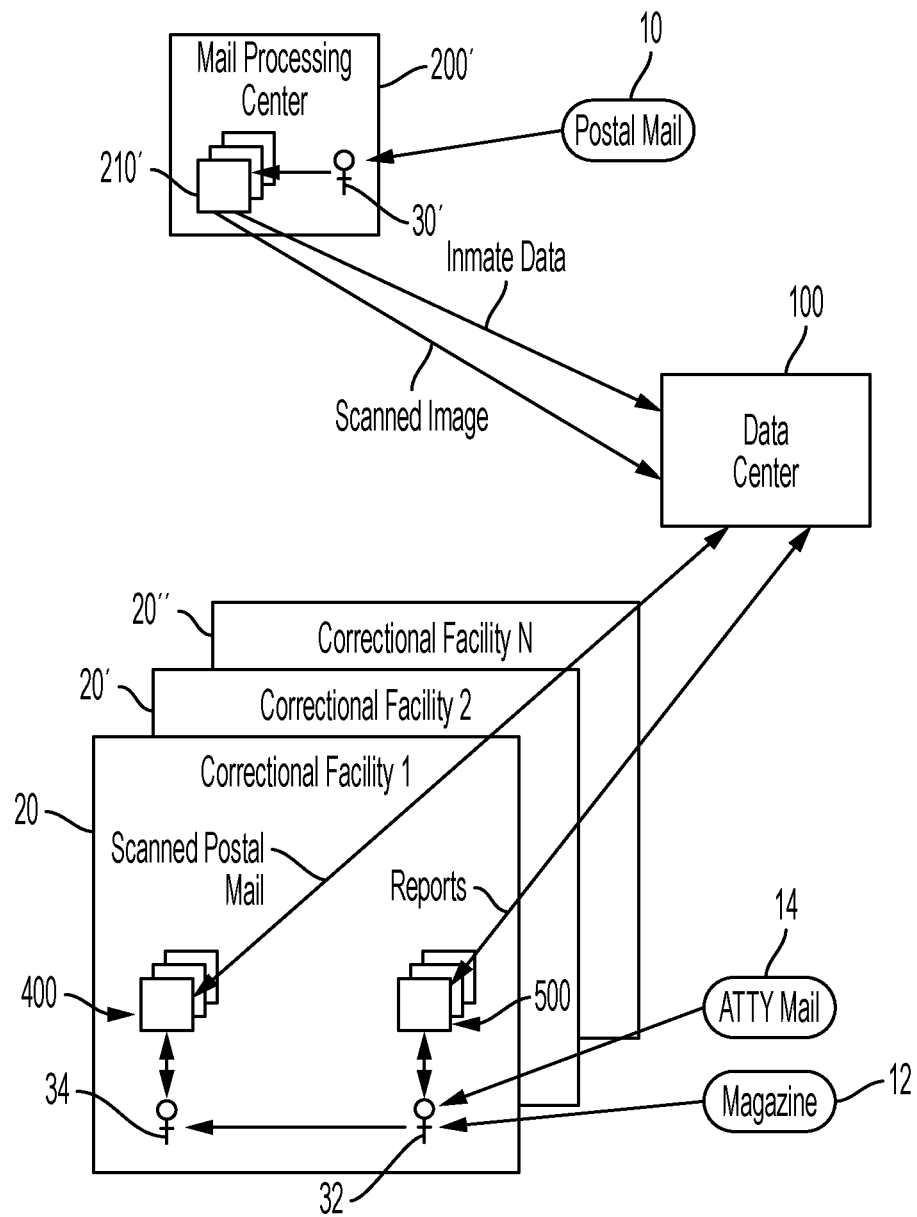
FIG. 3 illustrates a block diagram of an embodiment of a method and system, in accordance with certain embodiments of the invention, in which at least a portion of postal mail processing occurs at a central mail processing center capable of serving a plurality of correctional facilities.

Referring to FIG. 3, embodiments according to the present disclosure my utilize a single mail processing center 200' that receives postal mail 10 for one correctional facility 20 or a plurality of correctional facilities 20, 20', 20". In such embodiments, institution staff 32 may receive attorney mail 14 and magazines 12 for physical delivery to inmates 34 with limited review and pre-processing. Other postal mail 10 would be received by outside mail processing center 200', in which processing staff 30' would receive and process postal mail 10, perhaps for a plurality of correctional facilities. Scanning station(s) 210' would be used to create scanned images of postal mail 10 and upload them to a system in data center 100, which may be physically within mail processing center 200', or remote from it, or cloud-based. Certain steps of the processing within mail processing center 200' are illustrated in FIG. 4, with example displays shown in FIGS. 5-11.

Figure 4:
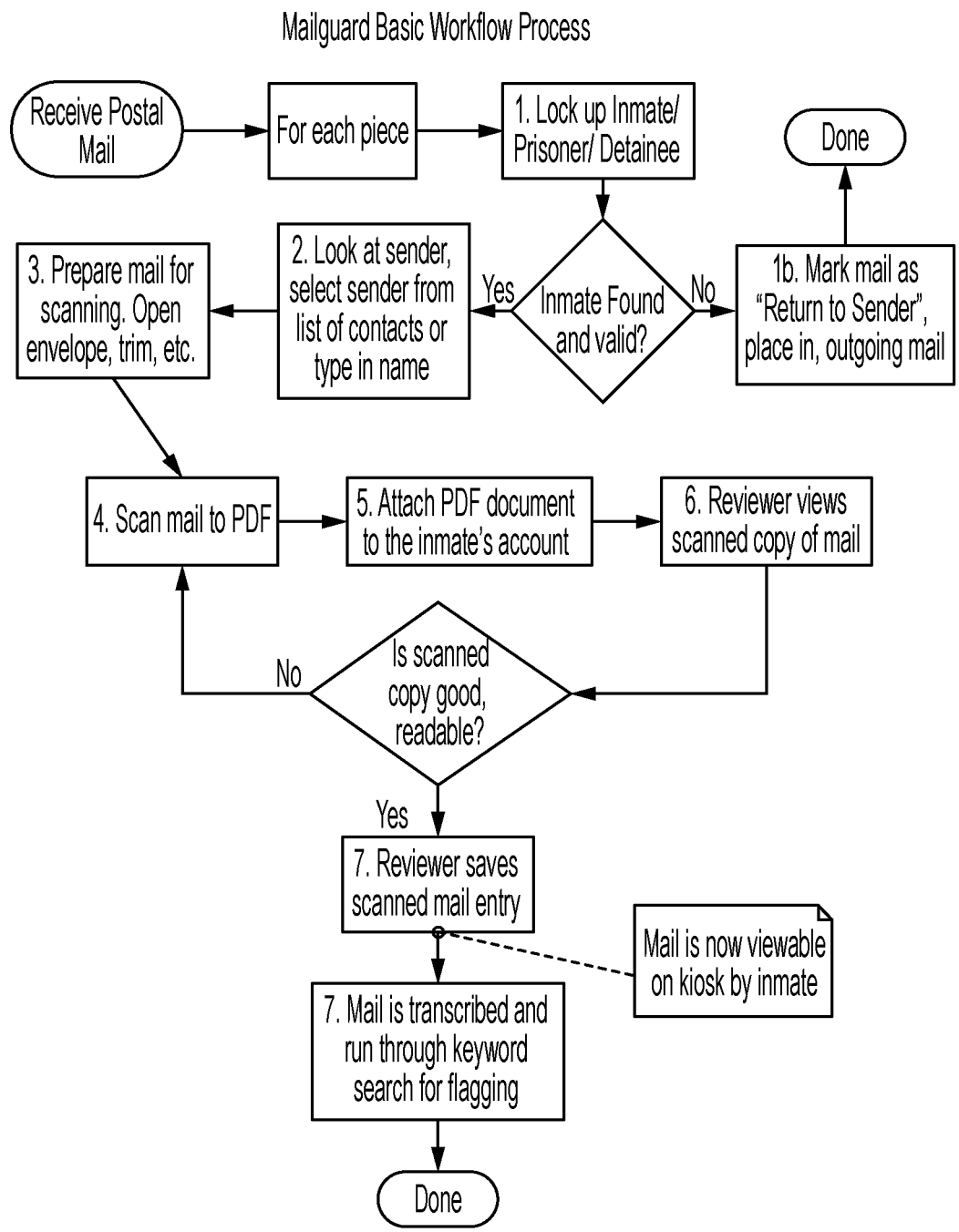
FIG. 4 illustrates a flowchart showing certain steps that may conveniently be carried out in the mail processing centers illustrated in FIGS. 2 and 3 in connection with certain embodiments of methods and systems of the invention.
Figure 6:
FIG. 6 illustrates a display that may conveniently be used in connection with steps illustrated in FIG. 4 and suitable for use in connection with certain embodiments of methods and systems according to the present invention.

As illustrated in step 1 of FIG. 4, and via the sample display in FIG. 5, when a piece of postal mail 10 is received, it is determined if the addressee is an inmate capable of receiving scanned mail. For example, a directory of inmate email accounts may be referenced. If the addressee is not capable of receiving mail, for example because the inmate was released or transferred prior to the date of receipt, the mail is marked "return to sender" and is deposited in outgoing mail as is shown in step 1b. In some embodiments, the mail may be scanned and put into the system even if the inmate has been released. In that case, the system would forward that mail to the inmate outside of the correctional facility. In certain exemplary embodiments, the inmate may be able to log into his inmate email account from outside of the correctional facility to access email and scanned postal mail. In even further embodiments, scanned postal mail may be forwarded to third parties, such as family members. For example, where an inmate has been released for a period of time, and has left no forwarding information, the scanned postal mail may be forwarded to an attorney of record or next of kin. As is shown in FIG. 5, identifying the recipient may be accomplished by searching a name or an identification number provided by the correctional facility and previously communicated to the sender of the postal mail per facility policies. Searches may be within a facility or across all facilities. In certain embodiments, the system housed in data center 100 may allow a given inmate to have aliases. In other embodiments, policies and procedures may require the use of a standard name or the marking of the envelope with a unique identification number. Where one or more matching inmates are found, the appropriate recipient may be selected from a list as shown in FIG. 6. Selection may occur by a variety of means including by selecting the name (displayed as a hyperlink as illustrated) or through buttons, touch selection, or other selecting from a drop down or list box.

In step 2 of FIG. 4, and as shown in the example display in FIG. 7, the sender's name may be entered for tracking purposes. As illustrated, a list of prior senders may be displayed, any of which may be selected. Where the sender cannot be identified, or has not previously been entered into the system, the name and/or location, and any other information deemed appropriate for tracking, of the sender may be entered at this stage, after which the "proceed" control can be used to move to the next step.

Figure 8:
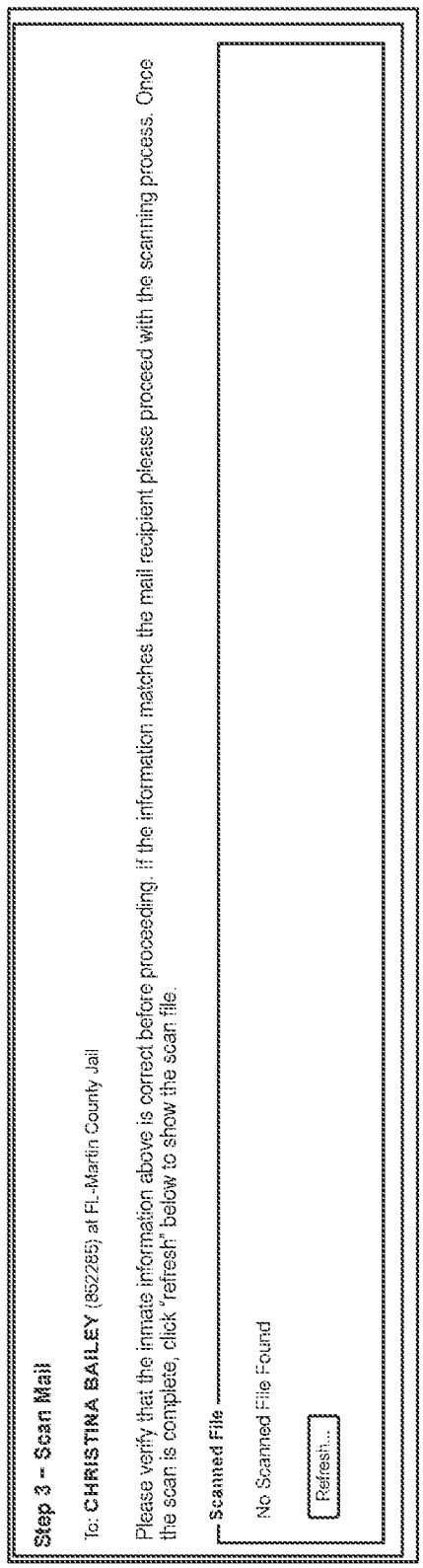
FIG. 8 illustrates a display that may conveniently be used in connection with steps illustrated in FIG. 4 and suitable for use in connection with certain embodiments of methods and systems according to the present invention.
Figure 11:
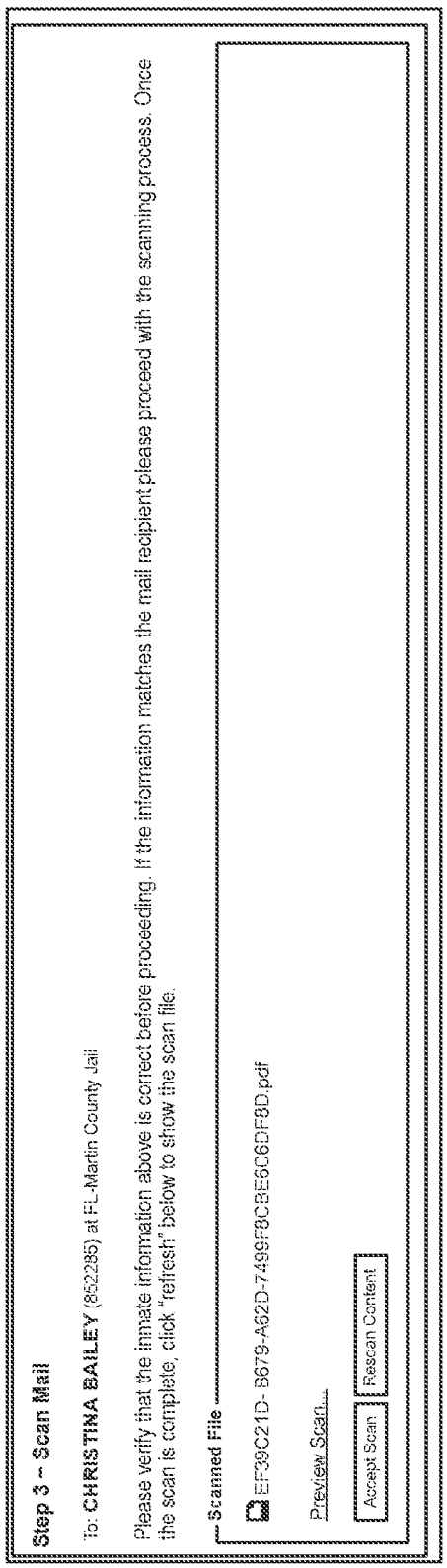
FIG. 11 illustrates a display that may conveniently be used in connection with steps illustrated in FIG. 4 and suitable for use in connection with certain embodiments of methods and systems according to the present invention.

As shown in step 3 of FIG. 4 and in the example display in FIG. 8, the postal mail can then be prepared for scanning. Preparation may involve opening the envelope, initial review for obscene material, and trimming to a size suitable for scanning.

Figure 10:
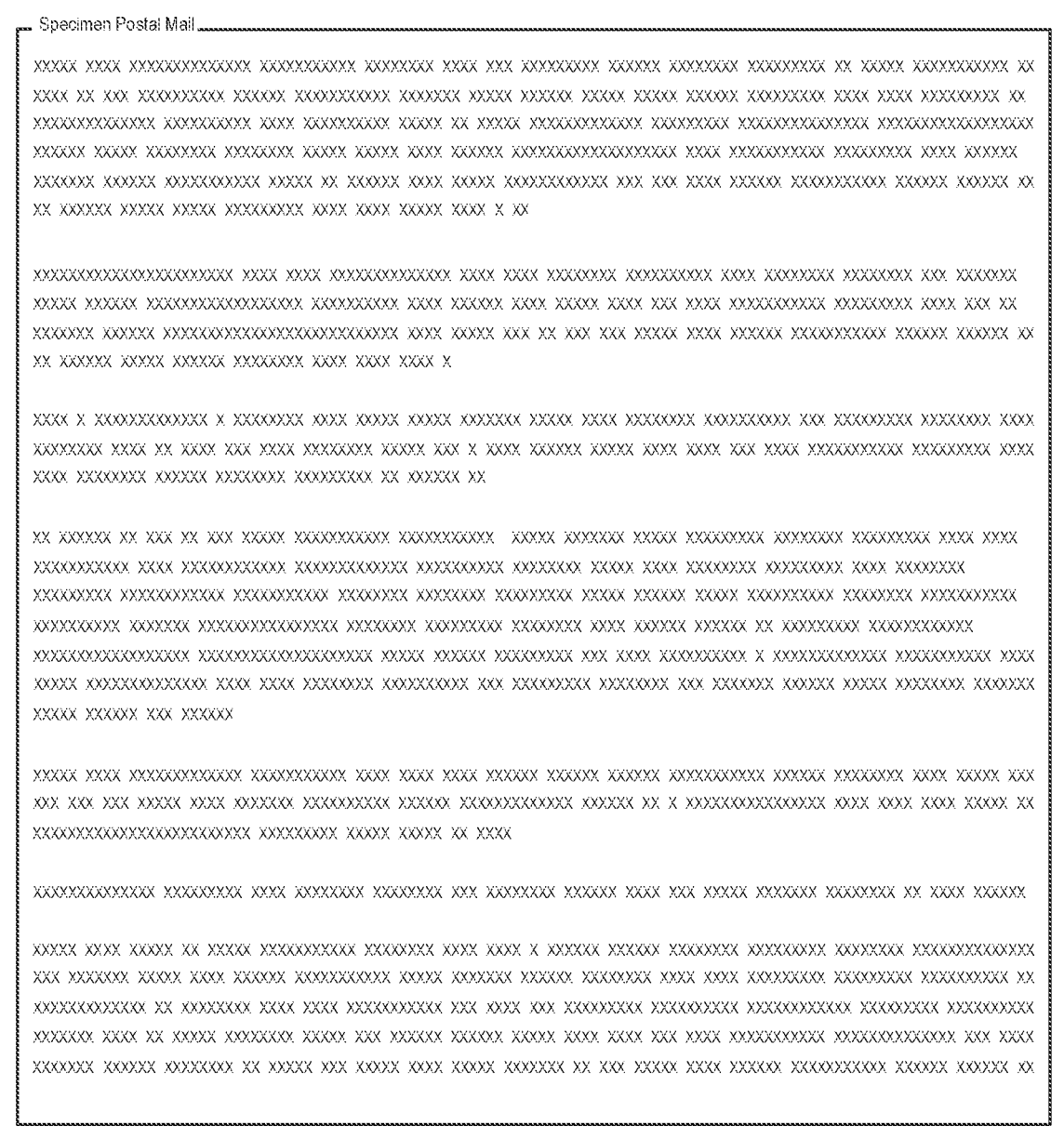
Figure 12:
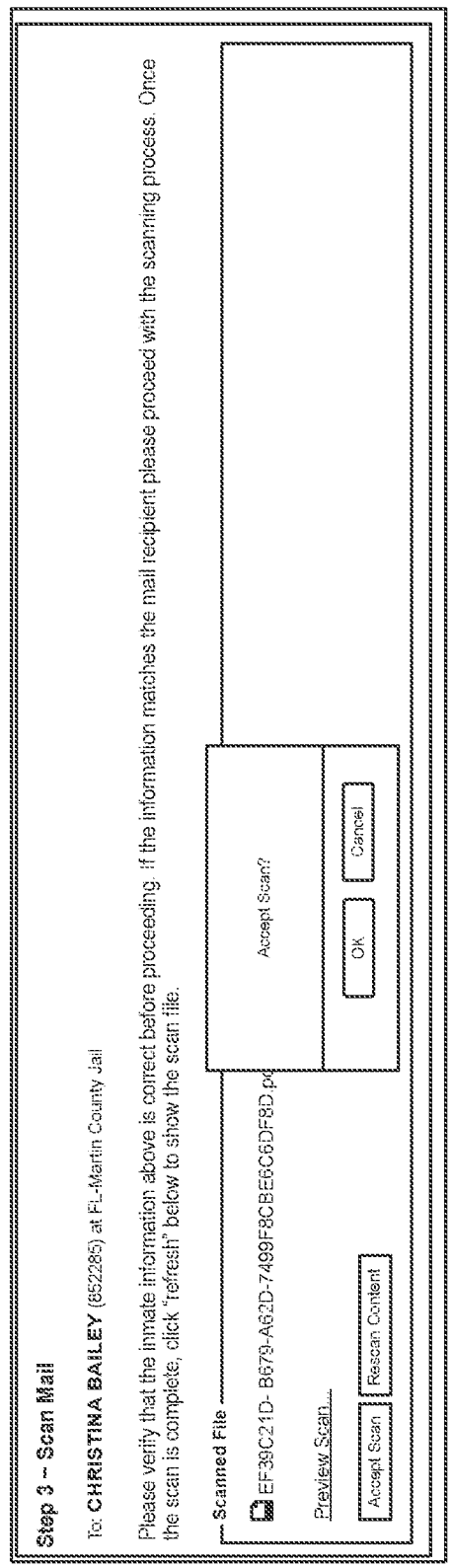
FIG. 12 illustrates a display that may conveniently be used in connection with steps illustrated in FIG. 4 and suitable for use in connection with certain embodiments of methods and systems according to the present invention.

As shown in step 4 of FIG. 4 and illustrated in the example display in FIG. 9, scanning may then be accomplished. This can be done in any variety of ways including by placing a scan control on the screen (not illustrated), or by utilizing the interface of the scanner itself (not illustrated). The scanner may be a network device or may be connected to the workstation being used. The scanner will then assign a unique identifier to the file scanned (preferably a GUID to avoid duplication among scanners), and present it as pdf file. Clicking a "preview scan" link or similar control can cause a copy of the scanned image (as shown in FIG. 10) to be displayed. This allows the worker to associate the image with the inmates account (step 5) and review the scanned copy for legibility (step 6). As is shown in the sample display illustrated in FIGS. 11 and 12, illegibility is not sufficient, a new scan can be performed either replacing or supplementing the original scan, as required by facility policies.

Once the scan is deemed acceptable further review and processing may occur, as shown in step 7 of FIG. 4. Such processing may involve one or more of redacting obscene content, manually flagging the communication for investigation, optical character recognition (to enable searching), printing to create a physical copy, forwarding to an investigative agency, or adding notes or comments for later review by investigators or institution staff or the inmate. Once the review process is complete, the scanned image is made available to the inmate as is further described below, or is held for further review and release according to facility policies. Where electronic searching is desired by the facility, and optical character recognition fails to adequately read the contents, the scanned image may be manually transcribed (step 8), with a text version being associated with the scanned image by the system. Transcription and optical character recognition are optional and may be used not at all, on particular messages flagged for transcription in step 7, or for all messages not amenable to optical character recognition.

Figure 13:
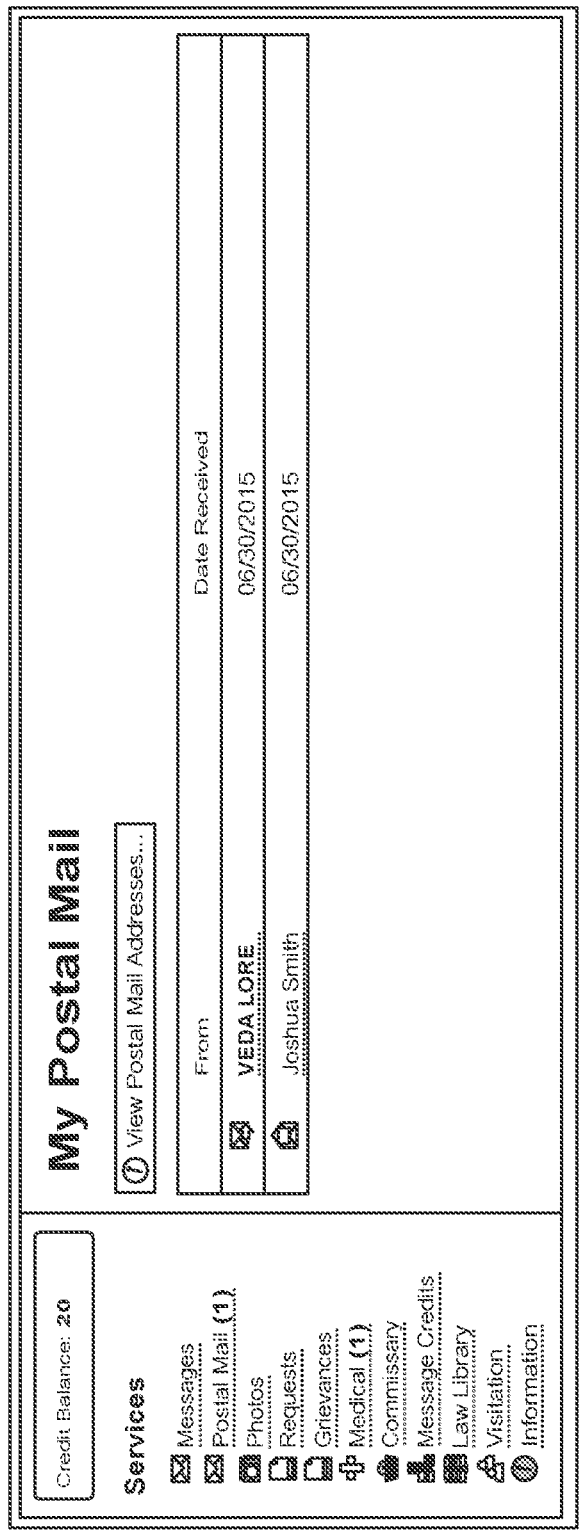
FIG. 13 illustrates a display that may conveniently be used by inmates in a correctional facility and suitable for use in connection with certain embodiments of methods and systems according to the present invention.
Figure 15:
FIG. 15 illustrates a third display that may conveniently be used by inmates in a correctional facility to display scanned postal mail and suitable for use in connection with certain embodiments of methods and systems according to the present invention.

FIG. 13 illustrates an example display that an inmate 34 would see on a computer terminal 400 when a scanned image of postal mail 10 is delivered electronically. In the illustrated embodiment, postal mail delivery is combined with other features of an inmate kiosk including email capability, photo delivery, requests to facility administration, grievances, etc. When Postal Mail is selected, a list of scanned postal mail 10 is provided, with icons and type face being used to indicate if the message has been read. As illustrated, the control View Postal Mail Addresses is provided to enable the inmate 34 to see the addresses to which postal mail may be sent.

Activating that control, in the illustrated embodiment, takes the inmate to the example display illustrated in FIG. 14. As has been noted above, certain postal mail (including attorney mail 14, magazines 12, books (not illustrated) and other approved parcels (not illustrated)) may not be amenable to electronic delivery and, therefore, are more conveniently sent to the facility in which inmate 34 is housed. The illustrated example screen provides instructions explaining the addresses to which different types of postal mail should be sent according to facility policy.

Figure 16:
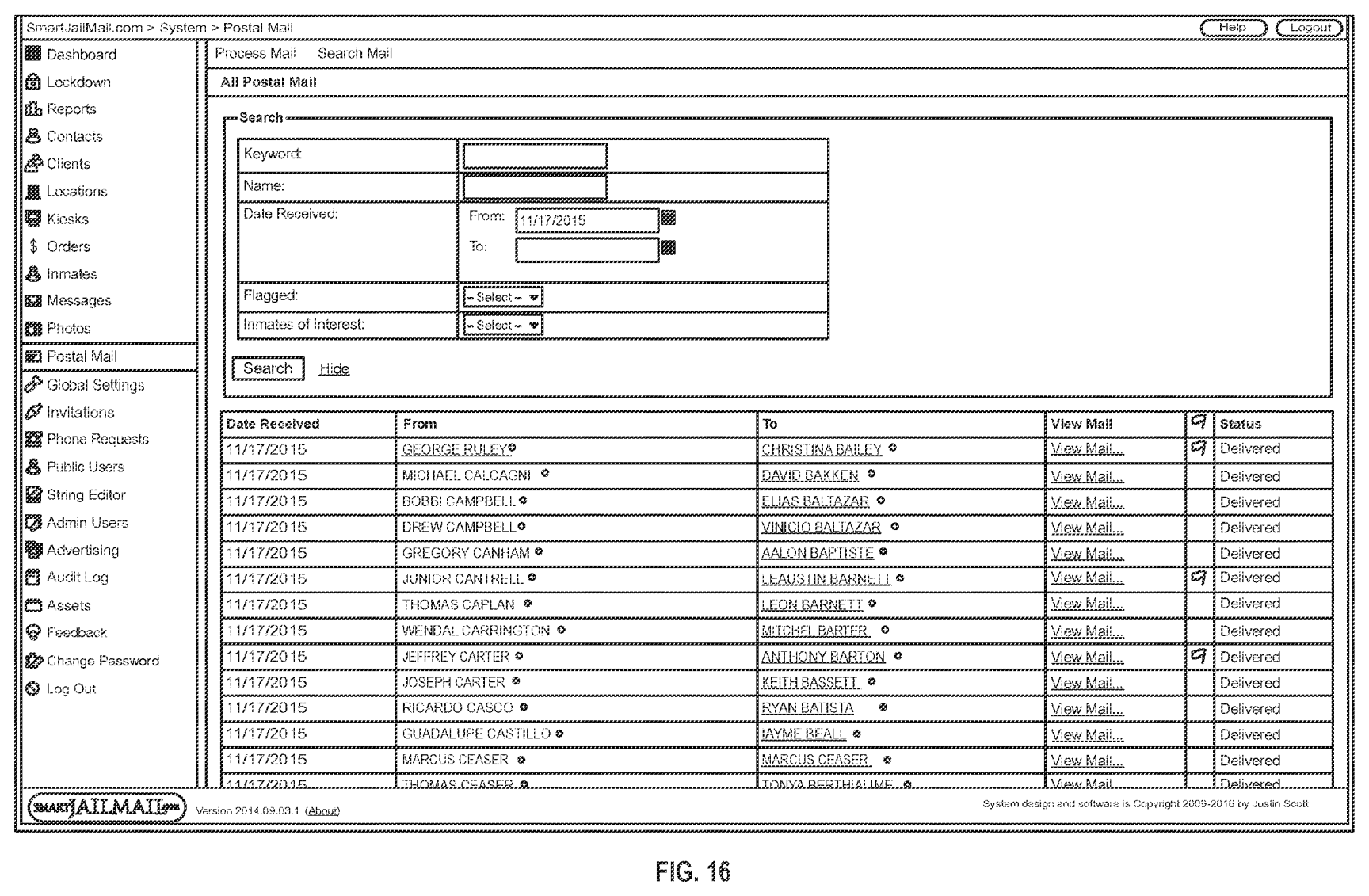

Referring again to FIG. 13, if an item of postal mail 10 is selected by selecting the hyperlink in the "From" column or the icon next to the hyperlink, the scanned version of postal mail 10 can be displayed to the inmate 34 (with redactions if applicable). FIG. 16 illustrates an example display showing a scanned version of postal mail 10.

Figure 17:
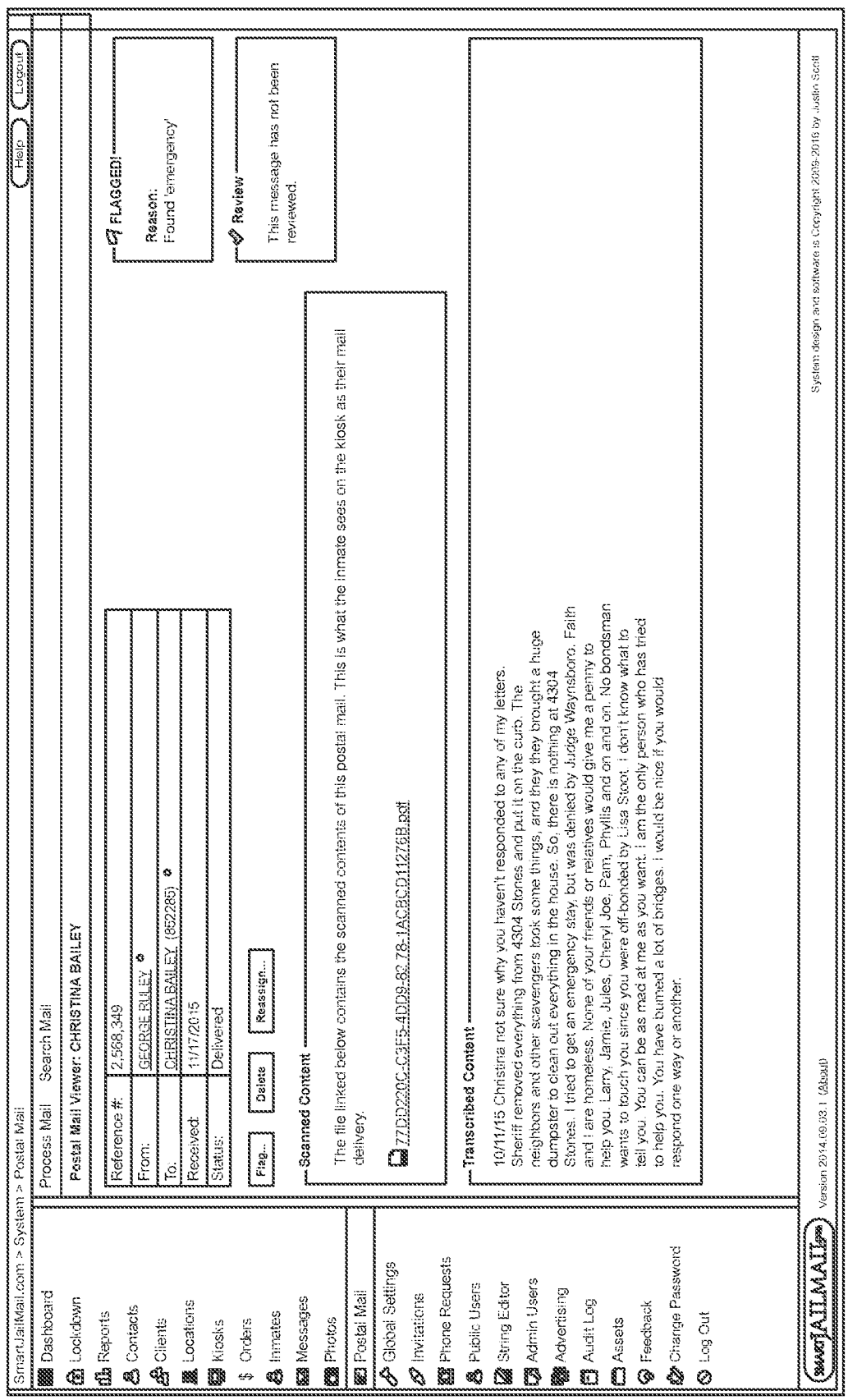
FIG. 17 illustrates a second display that may conveniently be used by staff in a correctional institution or investigators and suitable for use in connection with certain embodiments of methods and systems according to the present invention.

In a controlled environment such as a correctional facility, postal mail is subject to review and analysis by institution staff and, sometimes, investigative personnel. FIG. 16 shows an example display of an administrative interface intended for use by institution staff or investigators. As illustrated, the interface is integrated with the facility administrative interface for email and other inmate communication functions accessible to inmates through computer terminal 400. Selecting "Postal Mail" invokes a search interface that allows personnel to search for particular messages. Searching may conveniently be enabled by keyword (for messages that have undergone optical character recognition or transcription), name, date, recipient, sender, or any other field associated with messages. The more detail entered when the postal mail 10 is initially processed, the more search options can be presented. Flags are used to call attention to particular messages. Flags may be set manually (using predefined categories) by institution staff 32 or mail processing staff 30. Flags may also be set automatically based on analysis of the message and its metadata. Examples of automatic flagging could include flagging messages from predefined individuals or locations (e.g. cities or countries or addresses) and flagging messages based on keywords in the message body. By clicking on a message, the details of the message are shown, as illustrated on FIG. 17. In addition to the content of the message and the scanned image being made available, staff may also manually flag or reassign a message to a different inmate. Erroneous messages can also be deleted. By accessing the link to the scanned image, the message can also be printed or forwarded to another person. Each function could, in certain embodiments, also be accessed through controls made available on the message detail display. Status information, such as whether the message has been reviewed, and what flags have been attached, may also be shown, for example, on the right hand side of the display. In certain embodiments, each step of accessing, reviewing, and updating each message can be logged in database tables or log files for auditing purposes.

Figure 18:
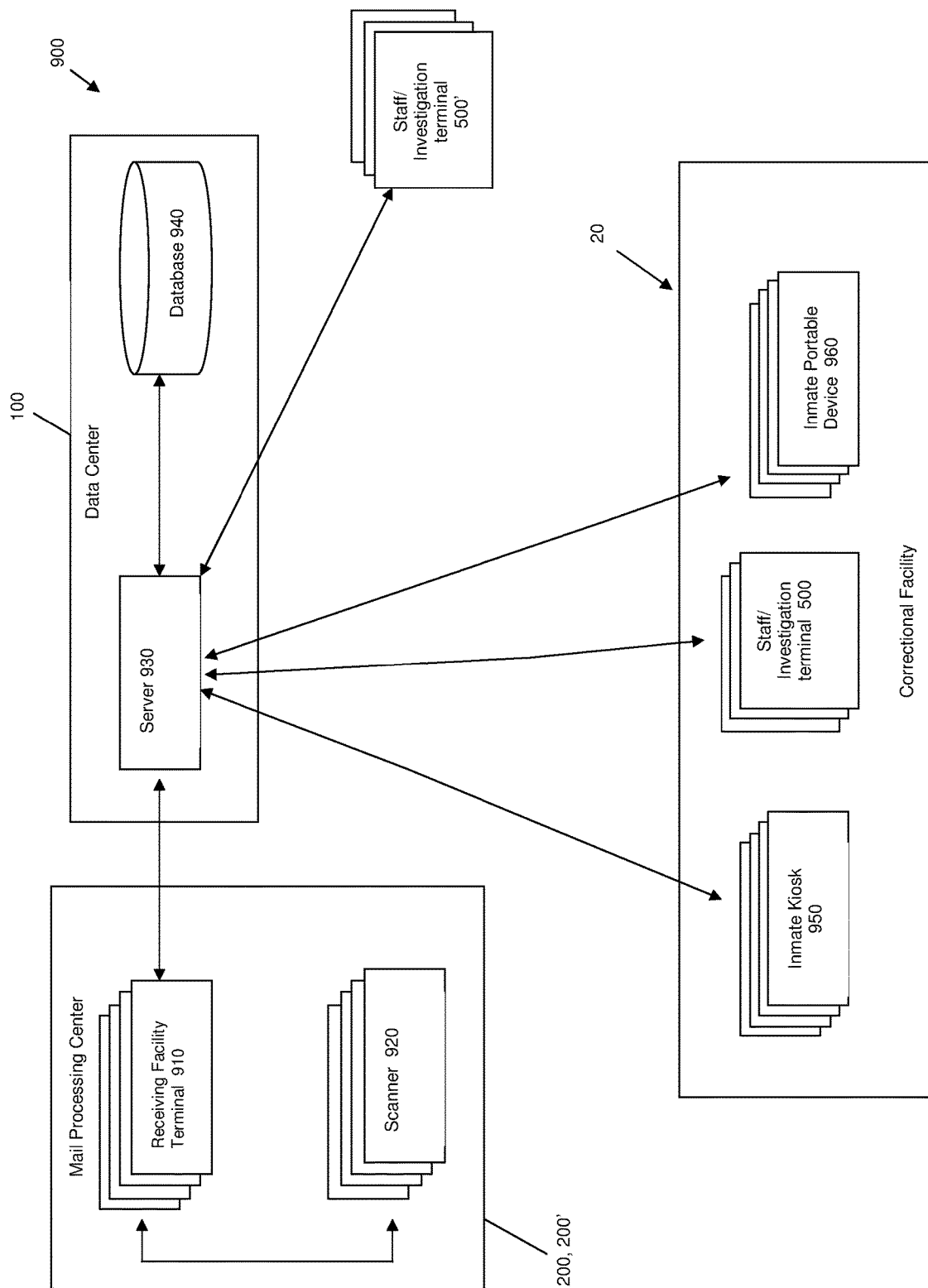
FIG. 18 illustrates a schematic representation of an architecture suitable for use with embodiments of the system and method according to an embodiment the present invention.

FIG. 18 illustrates a block diagram of an embodiment for postal mail 10 coming into correctional facility 20 through mail processing center 200 or 200' . . . sup. I Receiving facility terminal(s) 10910 may be computers, tablets, or dumb terminals for use by facility personnel. Receiving facility terminal(s) 10910 are connected electronically to scanner(s) 920. Scanner(s) 920 may be connected to individual receiving facility terminal(s) 10910 as shown or may be on a common network (not illustrated). In certain embodiments scanner(s) 920 may be in the correctional facility and in others they may be in a remote location such as a central processing facility. In other embodiments, one or more high speed scanners (not illustrated) may be shared by multiple receiving facility terminals 10910. It should be noted that in FIGS. 2 and 3, scanner station 210, 210' are referenced. In FIG. 18, Receiving Facility Terminal 10910 and Scanner 920 are referenced separately. It will be understood that scanner station 210, 210' shown in FIGS. 2 and 3 comprise the combination of Receiving Facility Terminal 10910 and Scanner 920 illustrated in FIG. 18. Similarly, whereas FIGS. 2 and 3 refer to computer terminal 400 (which may be a variety of electronic devices used by an inmate), in the system embodiment illustrated in FIG. 18, Inmate Kiosk 950 and Inmate Portable Device 960 (both of which are examples of computer terminal 400 shown in FIGS. 2 and 3) are shown separately for exemplary and discussion purposes.

Receiving facility terminal(s) 10910 are connected by a local area or wide area network (not shown) to one or more server 930 in a data center 100. Preferably, server 930 provides a web server that delivers the screens used by receiving facility terminal(s) 10910 as web pages, which may include active controls capable of controlling scanner(s) 920. Server 930 preferably is connected to database 940 which may contain records of the inmates in the correctional facility, records of postal mail processing and viewing, text indexes of electronic messages, and records of the personnel responsible for such processing. If the postal mail system is integrated with an electronic mail, video visitation or other system, a common database 940 can be used to support all features. Where electronic messages are scanned using optical character recognition, such scanning may occur on scanner(s) 920, receiving facility terminal(s) 10910 or server 930. Alternatively, receiving facility terminals 10910, or other remote terminals (not illustrated) may be used to allow entering of transcribed messages. As will be understood by those of skill in the art, server 930 and database 940 may be on one or more separate servers, may be on a single server, or may be on one or more of receiving facility terminal(s) 10910.

Inmate kiosk(s) 950 and inmate portable device(s) 960 are electronically connected to server 930 through a local area network or wide area network, either of which may be wired or wireless. It will be understood that inmate kiosk(s) 950 and inmate portable device(s) 960 are examples of computer terminals 400 described above. Inmate kiosk(s) 950 may conveniently be the same kiosk(s) used for purposes such as email delivery, commissary ordering, video visitation, and/or other services such as the SmartKiosk™ offered by Smart Communications. Alternatively, inmate kiosks 950 may be kiosks dedicated to delivery of electronic images of postal mail.

Inmate portable device(s) 960 may be portable tablets, music players, smart phones, or other portable devices used by inmates and capable of communicating with server 930 through a network connection. In certain embodiments (not illustrated) inmate portable device(s) 960 may include the ability to download messages from server 930 while connected to a network, for later viewing when not connected to the network.

As discussed above, server 930 may conveniently deliver the interface to inmate kiosk(s) 950 and/or inmate portable device(s) 960 as web pages, thereby minimizing the need for custom client software. As coordination and viewing is controlled by server 930 in such embodiments, server 930 may monitor and log such accesses (either in log files or database tables as appropriate).

It will be understood by those of skill in the art that either inmate kiosk(s) 950 or inmate portable device(s) 960, or both, may be used in a single installation and that the number of each may be one or many depending on available network bandwidth and the capabilities of server 930. Some installations may thus only have a single inmate kiosk 950 or a single inmate portable device 960, while other installations have one or more of each.

As has been discussed above, there are times when it may be necessary for institution staff or outside investigators to have access to processed postal mail. In-institution staff/investigator terminal(s) 500 (within the correctional facility) and outside-institution staff/investigator terminals 500' can be used for this purpose. Such terminals may be computers, laptops, dumb terminals, virtual machines, kiosks or any other electronic device with a display and the ability to connect to server 930 through a network. Login credentials and other user identification means known in the industry (e.g. 2-step authentication, biometrics, hardware identification, electronic key devices and the like) may be used to identify authorized staff and investigators and enhance system security.

Conceptual Architecture

One aspect of the present invention provides mail-tracking of communications sent to an inmate who is incarcerated in a correctional facility. The term "mail-tracking" is used generically herein and is not intended to be limiting; it is intended to cover, but is not limited to, any time of communication that is sent to an inmate, including physical communication via postal mail, internal letters, digital communication such as email, chat, messages, etc. The mail-tracking systems and methods disclosed herein permit a sender to receive status notifications and/or check the status of communication that the sender has initiated to be sent to an inmate. The terms "communication" and "postal mail" are also used generically herein and are not intended to be limiting—the terms are intended to cover, but are not limited to, communication via physical letters, postal mail, etc., as well as digital communication such as email, chat, digital text and multi-media messages, etc.

In some embodiments, public users may be provided with access to status information of processed postal mail (however, the invention is not limited to applications covering postal mail) and associated information that is within the confines of the central mail facility for correction centers or within the correction facilities themselves. In conventional postal mail handling systems, such as the US Postal Service, Federal Express, UPS, to name a few, a sender may use a portal Web site or other user interfaces to enter a tracking number that has been assigned to a mailed item. By entering the tracking number, a sender may obtain status information of the mailed item. Typically, the final status of a mail item is that it has been delivered. In some cases, the sender may have requested a service that requires a signature. In such cases, the sender may also obtain a notification that the mail item has been signed for, and may obtain a view of the signed receipt. However, in the present application, mail items are delivered to a central mail facility. Subsequently, once delivered to the central mail facility, the last notice to the sender typically would be that the mail item has been delivered to the central mail facility. The sender would then only assume that the mail item made it to the appropriate correction facility and was delivered to the intended inmate.

However, in some cases a correction facility may deny delivery of a mail item, for example, because of the status of the inmate, or because the mail item violates a policy or procedure of the correction facility. One approach to handling mail items that have been rejected has been to erase a digital version of the mail item and destroy an original physical correspondence. The approach may include turning over the digital version of the mail item and/or the original physical correspondence to an investigative body or agency. The approach may include archiving the digital version of the mail item and/or original physical correspondence for later distribution to an inmate, for example, upon the inmate's release. However, the sender is not made aware of actions taken within the correction facility and may just assume that the mail item has been delivered to the intended inmate.

In addition, conventional postal mail handling systems do not verify that the sender return address is a legitimate name and address. Generally, the return address is only used in the case that the mail item cannot be delivered to the address that the mail item was addressed to. A sender may intentionally include a false return address in order to send an item anonymously, or to avoid revealing an address of the sender.

An object of the present disclosure is to obtain accurate information about senders and inmates that senders send postal mail items to, and store tracking information that may be utilized for investigative purposes. In order to achieve this goal, senders are encouraged to register to obtain an account ID so that detailed information concerning mail items that are sent by way of conventional delivery services can be obtained up to and including notification that an inmate has actually seen a correspondence.

By registering with the service provided by the central mail facility, accurate information concerning the sender may be obtained. Information that may be collected concerning the sender may include the sender's first and last name, and could also include the sender's full name, sender's residence address, sender's e-mail address, sender's contact phone number(s) and whether a phone number may be used to receive text messages. In some cases, information about a device that was used to post the registration information may be obtained, including an Internet address and/or an identifier for the machine if registration was performed using a computer or smartphone, a phone number that can receive an associated text message if registration is performed by phone, etc. Other information that may be obtained for a sender may include the type of Web browser that was used during registration. In the case that the user uses a smartphone to register, the sender information may include GPS location.

In some embodiments, the obtained sender information may first be verified and an account ID that is temporary may be issued to the sender. Once verified, a permanent account ID may be issued to the sender. Provided the permanent account number, the sender may be able to check the status of the mail item within the central mail facility and at devices, such as kiosks, located within the correction facility. The sender may also receive notifications, including notification that a mail item has been accepted, or rejected, that a mail item has been delivered to an inmate, and that a mail item has been accessed by the inmate.

Figure 19:
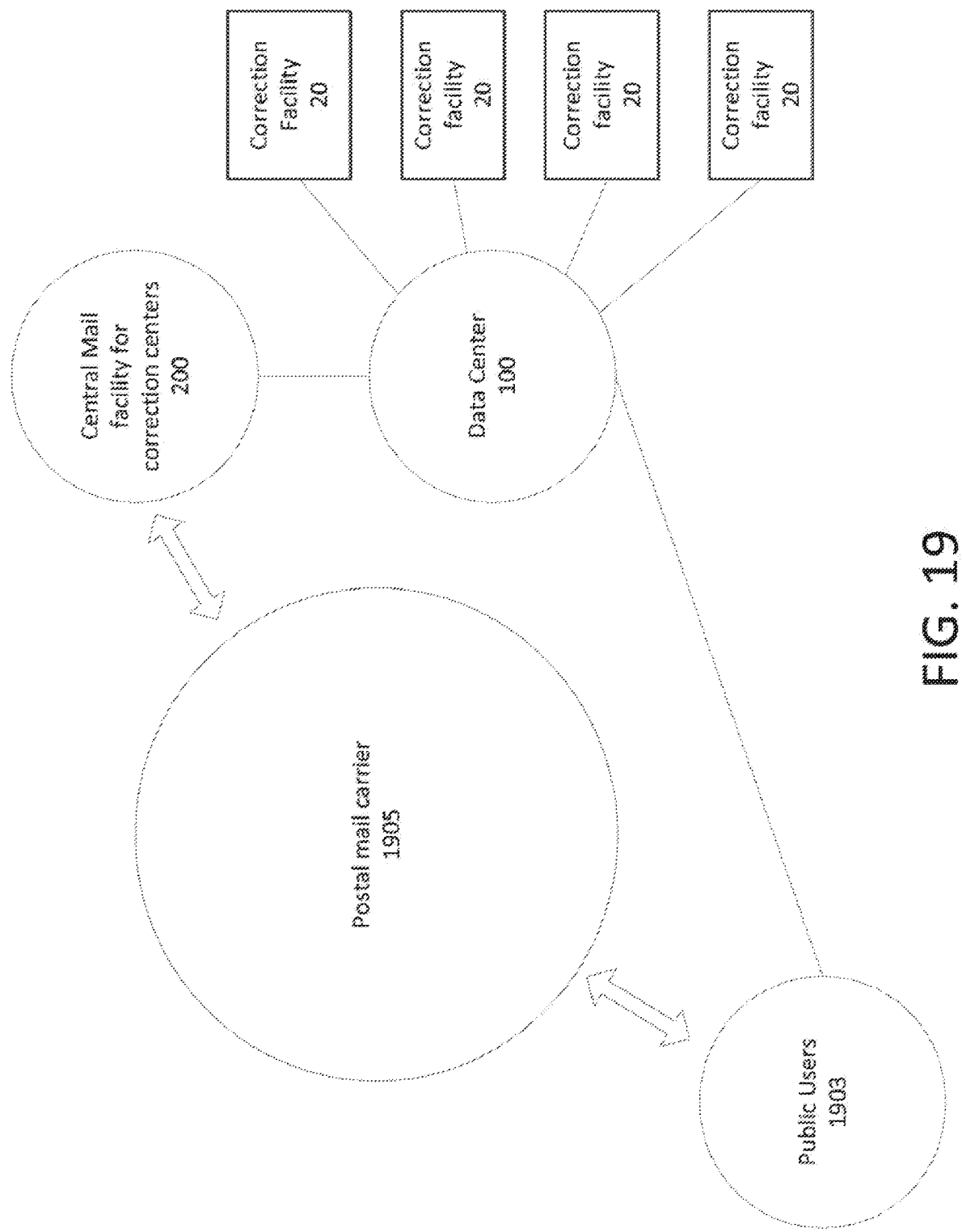
FIG. 19 illustrates a schematic representation of an architecture suitable for use with embodiments of the system and method according to the present invention.

FIG. 19 illustrates a schematic representation of an architecture suitable for use with embodiments of the system and method according to the present invention. Regarding FIG. 19, public users 1903 may send postal mail items to inmates of a correction facility 20 by way of a government run or commercial postal mail carrier 1905 such as the US Postal Service, UPS, and FedEx, to name a few. The mail item may be accepted at a central mail facility 200 that is authorized to receive mail for one or more correction centers. The postal mail carrier 1905 may provide a service that enables status information to be viewed by the public user for his/her mailed postal mail. The status information may be sent over any of various electronic communications services, such as e-mail or text messages, or accessed by connecting to a Web portal or other Internet-facilitated communication path that may take as input a tracking number and forward it to a server that can supply status information. The service provided by the postal mail carrier 1905 is performed by a computer-based tracking system of the postal mail carrier and serves information up to and including the status of delivery of the mail item to the central mail facility 200. As mentioned above, the service of the postal mail carrier does not provide information for a mail item after it has been delivered to the central mail facility 200.

Although many of process steps described herein are described as being performed by a mail processing facility, it is contemplated, without departing from the scope of the invention, that the specific entity performing the various process steps may be another entity, including, but not limited to data center, post mail carrier, correctional facility, etc.

Figure 22:
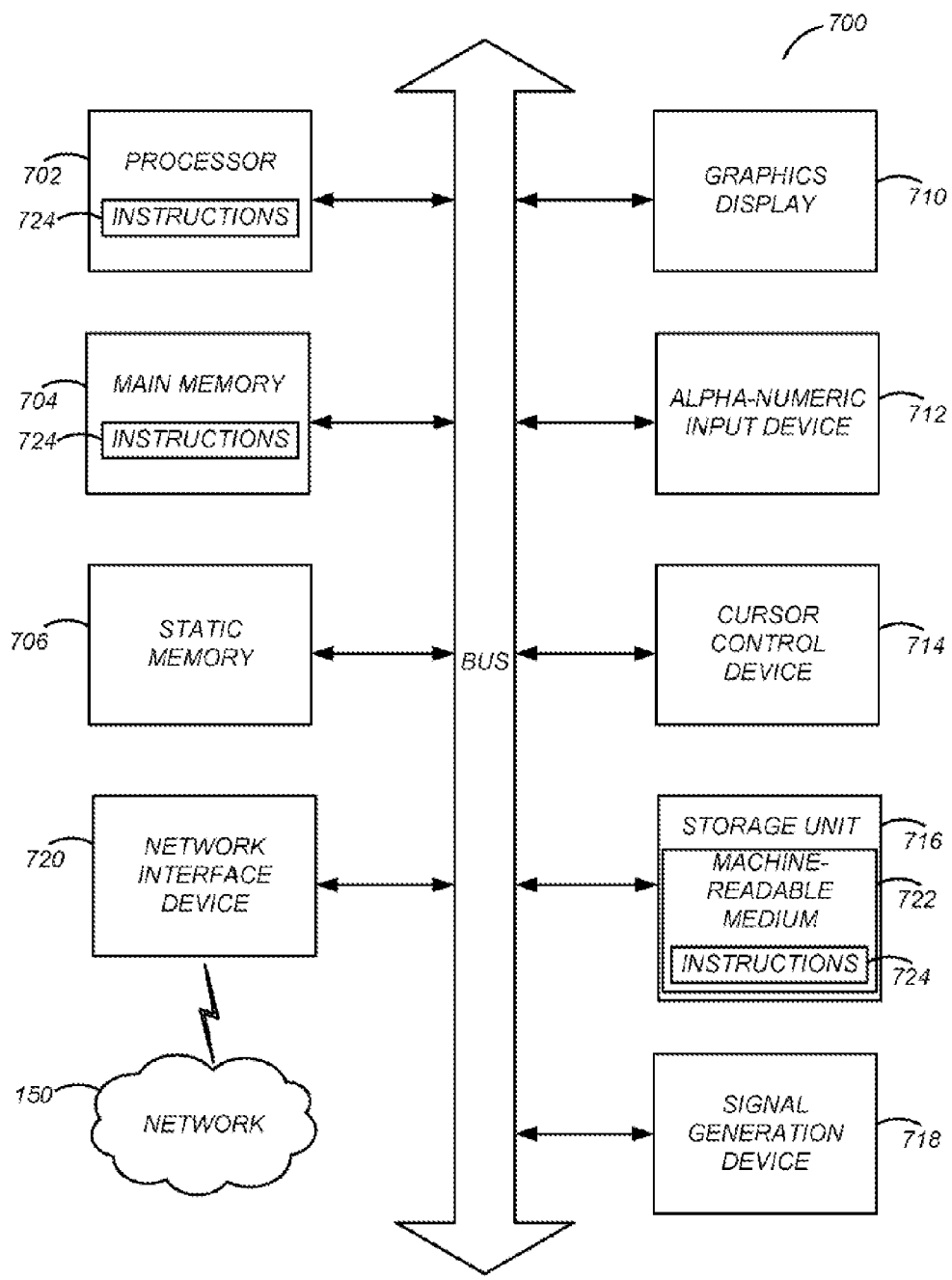
FIG. 22 illustrates one embodiment of components of an example machine able to read instructions from a machine-readable medium and execute them in a processor (or controller).
Figure 23:
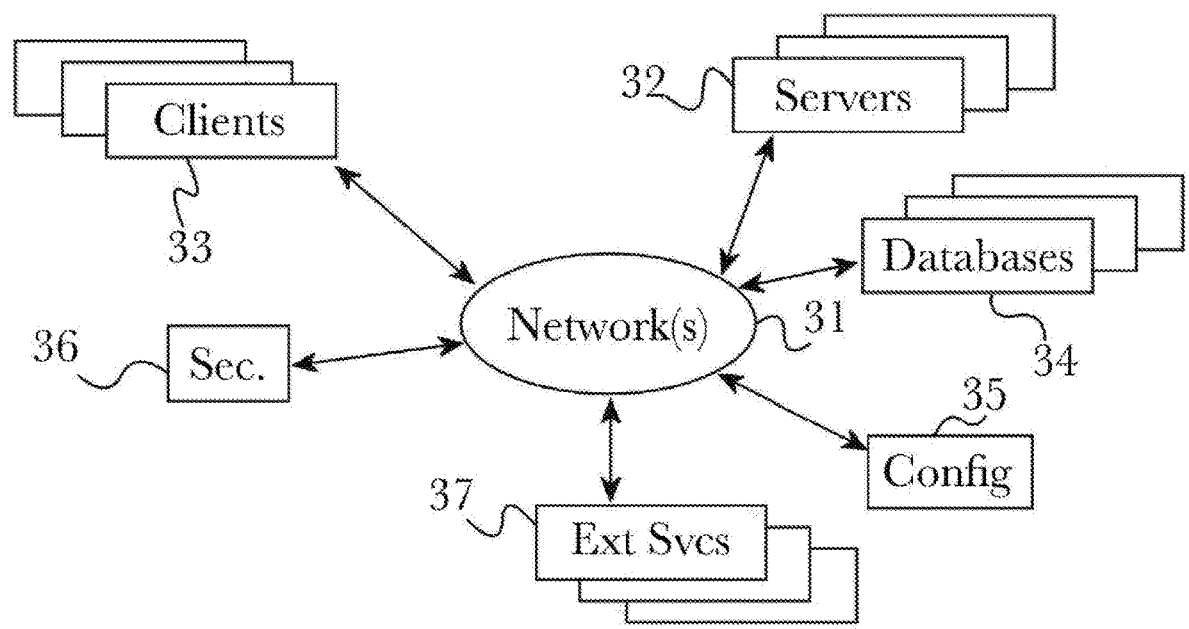
FIG. 23 illustrates on embodiment of the computing architecture that supports an embodiment of the inventive disclosure.
Figure 24:
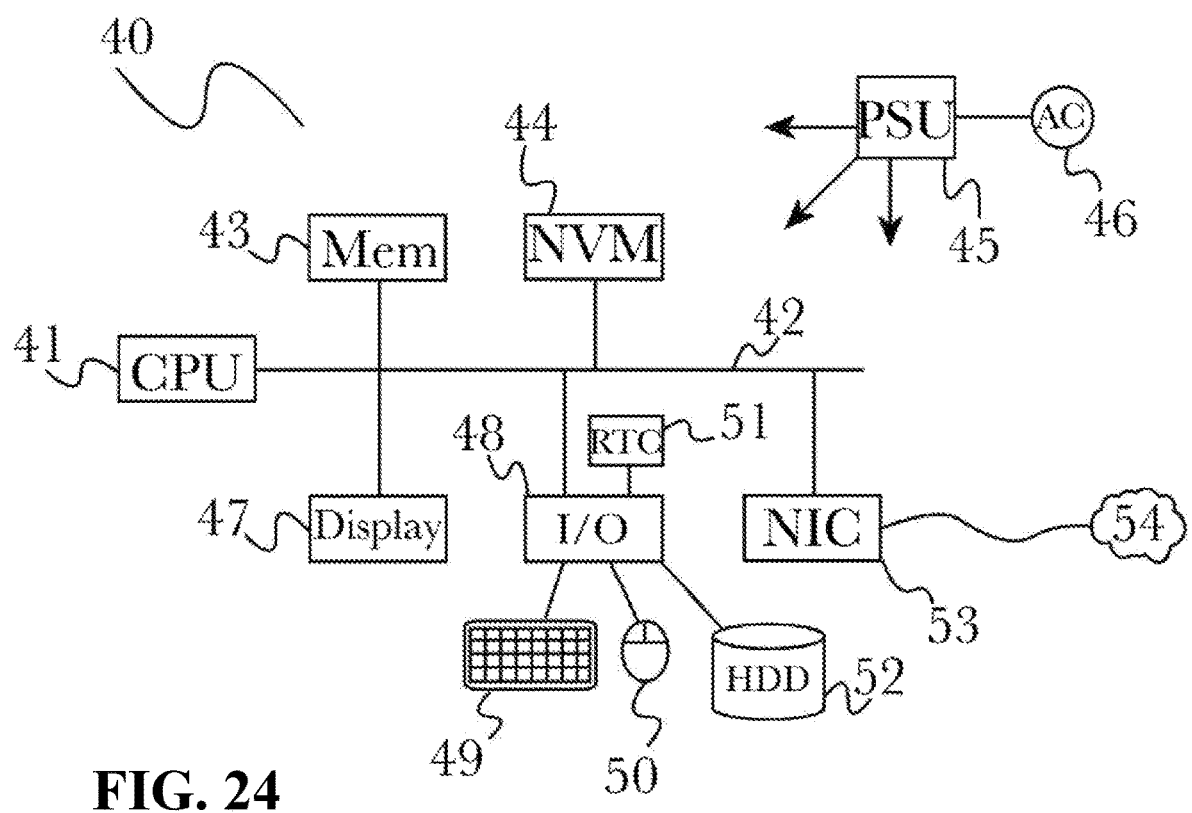
FIG. 24 illustrates components of a computing device that supports an embodiment of the inventive disclosure.

FIGS. 22, 23, and 24 illustrate computing devices that may embody the various systems, modules, and entities illustrated in FIG. 19 and elsewhere in the specification. In one embodiment, the central mail facility 200 may provide information services by way of a computer server and a database management system, which may be provided in data center 100. A data center 100 may include a network of computer servers 930, the structure and operation of which is described further below in reference to FIGS. 22, 23, and 24.

In one embodiment, the computer servers 930 may run a network operating system, for example Windows Server, a version of Unix OS, or Mac OS Server. In some embodiments, at least one server 930 may execute one or more operating systems as virtual machines. Each computer server 930 may be implemented as a computer system as described in greater detail below in reference to FIGS. 22, 23, and 24.

The various devices illustrated in FIG. 19, and the various actions ascribed to various entities may be performed on client devices as described in the sections below. These devices, including the devices used by public users 1903 are hereinafter also referred to as client device(s) or devices more generally, and include, a computer or computing device including functionality for communicating (e.g., remotely) over a network. Data may be collected from client devices, and data requests may be initiated from each client device. Client device(s) may be a server, a desktop computer, a laptop computer, personal digital assistant (PDA), an in- or out-of-car navigation system, a smart phone or other cellular or mobile phone, or mobile gaming device, among other suitable computing devices. Client devices may execute one or more client applications, such as a web browser (e.g., Microsoft Windows Internet Explorer, Mozilla Firefox, Apple Safari, Google Chrome, and Opera, etc.), or a dedicated application to submit user data, or to make prediction queries over a network.

In particular embodiments, each device described herein and illustrated in the various figures may be an electronic device including hardware, software, or embedded logic components or a combination of two or more such components and capable of carrying out the appropriate functions implemented or supported by the device. For example and without limitation, a device may be a desktop computer system, a notebook computer system, a netbook computer system, a handheld electronic device, or a mobile telephone. The present disclosure contemplates any device. A device may enable a network user at the user device to access network. A device may enable its user to communicate with other users at other devices.

The devices, including public user device 1903 and sender device may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A sender device may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the device one or more Hyper Text Markup Language (HTML) files responsive to the HTTP request. The sender device may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The device may also include an application that is loaded onto the sender device. The application obtains data from the network and displays it to the user within the application 533 interface.

Exemplary sender devices are illustrated in FIGS. 22, 23, and 24, which are described in greater detail further below. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

The various devices described in FIGS. 18 and 19 may be connected via a network. The network generally represents a network or collection of networks (such as the Internet or a corporate intranet, or a combination of both) over which the various components communicate (including other components that may be necessary to execute the system described herein, as would be readily understood to a person of ordinary skill in the art). In particular embodiments, network is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks. One or more links connect the systems and databases described herein to the network. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network, and any suitable link for connecting the various systems and databases described herein.

The network connects the various systems and computing devices described or referenced herein. In particular embodiments, network is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks. The present disclosure contemplates any suitable network.

One or more links couple one or more systems, engines or devices to the network. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various clients devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Process for Tracking Communication in a Correctional Facility

As described above, a sender may never know whether a mail item has been accepted by the correction facility 20 and whether the intended recipient inmate has received the mail item and has read the mail item. Instead, the sender may assume that because the mail item has been delivered, according to the status indicated by the postal mail carrier 1905, that the mail item will be automatically provided to the intended recipient inmate. In other words, the perspective of the sender is that the place of delivery by the postal mail carrier 1905 is essentially a black box.

In order to provide more transparency in the postal mail delivery process, the process described herein associated as sender ID with each communication that originates from the sender. Generally, the computer implemented process described herein is comprised of obtaining digital mail data associated with a communication sent to an inmate by a sender, determining whether the sender is associated with a sender ID, providing registration information to the sender if the sender is not associated with a sender ID, wherein the registration information enables a sender to register for a mail-tracking system and receive updates regarding the communication, obtaining a sender information check when the sender registers for the mail-tracking system, the sender information provided by the sender to register for the mail-tracking system, collecting sender data when the sender registers for the mail-tracking system, generating sender ID that is associated with the sender once the sender has registered for the mail-tracking system, associating the obtained digital mail data with the verified sender ID once it is made available, obtaining contraband analysis on the communication, flagging the digital mail data if the obtained contraband analysis indicates that the communication is comprised of contraband, updating the mail-tracking system, wherein the sender is enabled to track the status of the communication by logging into the mail-tracking system with credentials associated with the sender ID, and collecting sender data when the sender logs into the mail-tracking system with credentials associated with the sender ID.

The process of associating a sender with an ID (hereinafter also referred to as sender ID, account ID, temporary ID, permanent ID, etc.) is described below. In one or more embodiments, the inventive process enables a sender to register with a mail tracking system of the central mail facility 1901 in order to obtain a permanent account ID for accessing the system. The mail tracking system may be performed in the data center 100. Once registered, a sender may use the system to both check the status of a mail item at any time and receive periodic notifications and/or event-driven notifications regarding the status of the mail item. Status information of a mail item that may be provided by the mail tracking system may include whether the mail item has been accepted or rejected by the correction facility, whether the mail item has been delivered for view by the recipient inmate, and whether the recipient inmate has accessed the mail item. Other information that may be provided includes date and time information, and amount, such as date and time of delivery for viewing, and date and time of access, location of delivery, location of access, and an ID of the person that accessed the mail item.

Figure 20A:
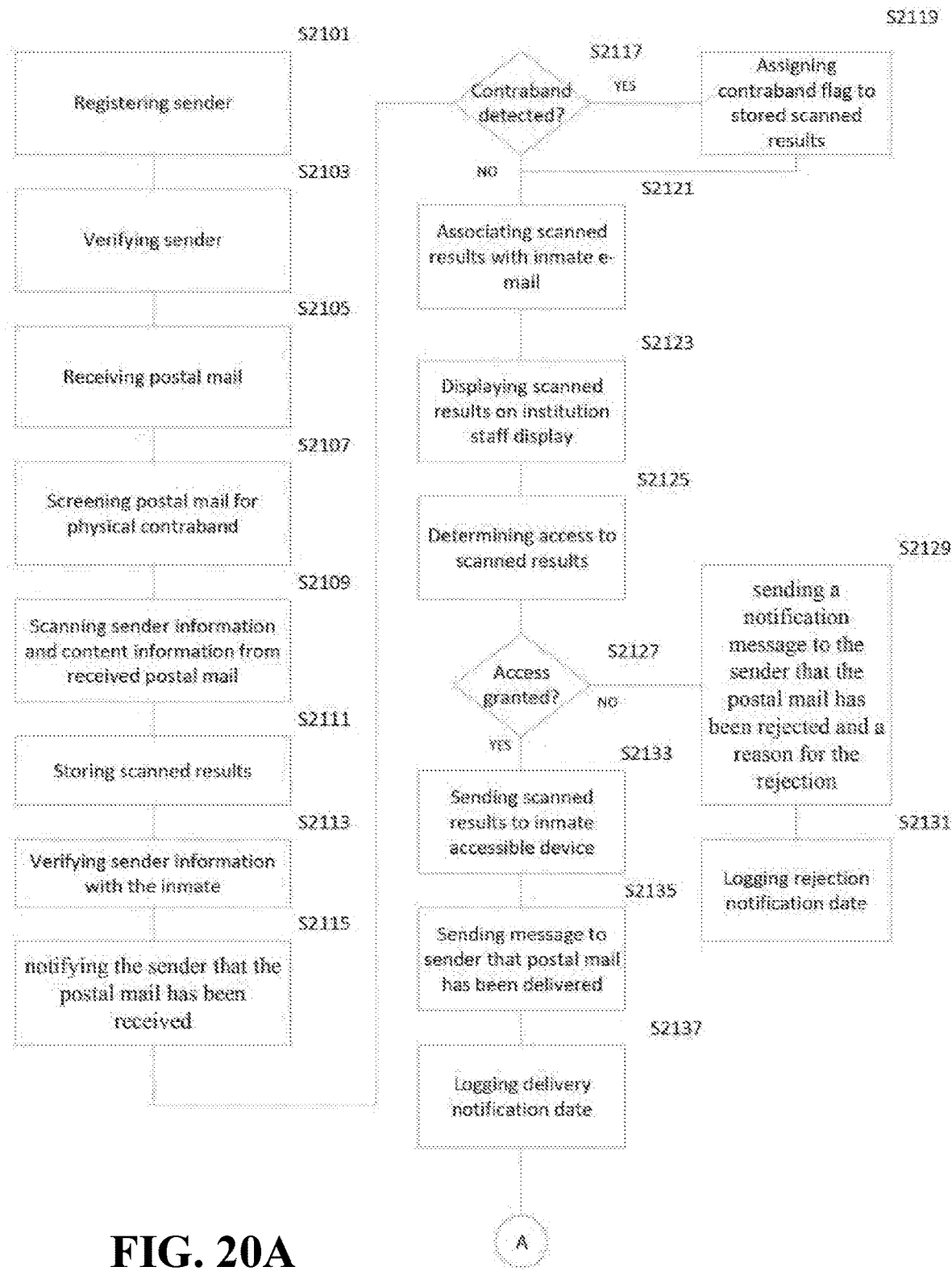
FIG. 20A illustrates a flowchart of an exemplary process for tracking communication sent to an inmate, in accordance with an embodiment of the invention.
Figure 20B:
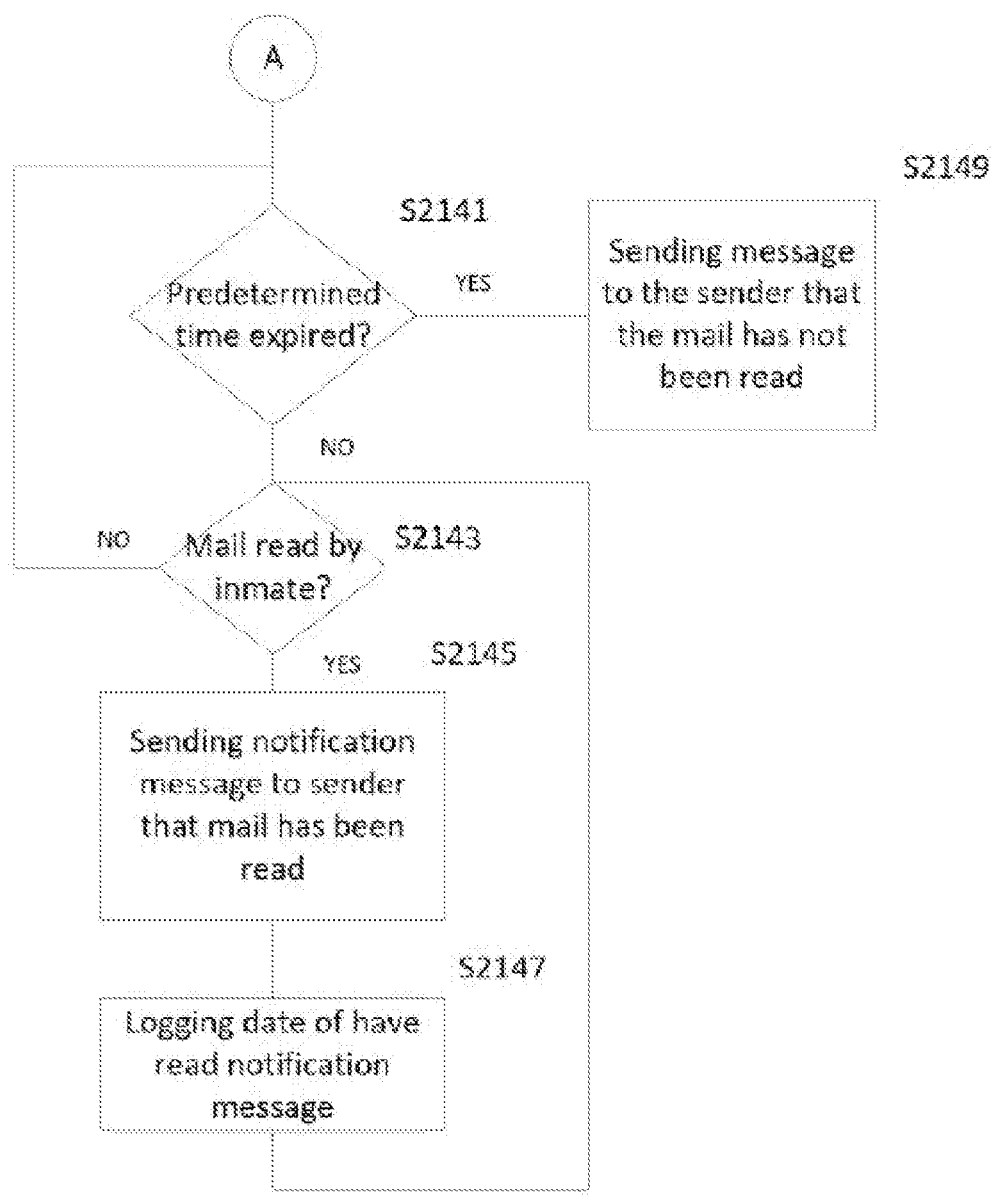
FIG. 20B illustrates a flowchart of an exemplary process for updating the mail-tracking system to enable a sender to receive digital updates, in accordance with an embodiment of the invention.

FIGS. 20A and 20B illustrate a flowchart for a postal mail tracking method that may be carried out by a computing device described in FIGS. 21, 22, 23, and 24. In one embodiment, the computing device may be executing the process steps described herein may be controlled by a mail processing center. The mail tracking method may be performed by a mail tracking system that is operated by the central mail facility 200 in data center 100. In one embodiment, the mail tracking system is a software-based system that is performed using resources of a management console of the central mail facility 200, a data center 100 and one or more devices in a correction facility 20, including inmate kiosks 950, terminals 500, and inmate portable devices 960. As mentioned above, the data center 100 includes one or more server computers 930 and a database management system 940, as illustrated in FIG. 18.

Regarding FIGS. 20A and 20B, in S2101, a sender may register with the mail tracking system. In one embodiment, the sender may register by using an application executing on a computing device that is illustrated in FIGS. 22, 23, and 24. In one embodiment, the sender may register by using a Web browser application on a device that is connected to a network, such as the World Wide Web. In one embodiment, the web browser application is enabled to access a Web portal of the central mail facility 200. The Web browser may be any browser that supports HTML forms for entering text. Javascript or other scripting language supported by the browser may be used to locally check entry of text into the browser.

The sender may enter information in the Web browser that is typical of mail sender information, such as sender name and sender mailing address, as well as other contact information in order to receive notifications electronically. Other contact information may include e-mail address, a phone number for a device that can accept text messages, possibly a second phone number as an emergency contact. In one embodiment, the sender may be required to provide either a valid cell phone number or an e-mail address for receiving notifications. The sender information that is entered by the sender is submitted to the one or more servers 930 and stored in the database management system 940.

The process for verifying sender information is described below. In one embodiment of the invention, the process for verifying sender information may be comprised of obtaining a sender information check, collecting sender data, and associating the sender with an ID (which may be generated in accordance with the process described above). In one embodiment of the invention, the process for verifying sender information may be performed when a user registers for the mail-tracking system. However, any one or more verification steps may be performed at anytime the sender interacts with the mail-tracking system.

The mail tracking system may collect other information for purposes of record keeping, such as the IP address that the sender registration information originated from, an identifier for the machine associated with the sender at the time of registration, and if the device is a mobile device, a GPS location of the device may also be obtained. Of course, date and time information may be included as well. In one embodiment, the other information collected for the sender may be stored in the database management system 940. In one embodiment of the invention, the process may include installing a tracking code or a cookie on the sender's computing device, wherein the tracking code The process of obtaining a sender information check is illustrated by step S2103. More specifically, as illustrated in 10S2103, the sender registration information such as sender name and address may be locally checked within the browser for completeness, so that addresses follow known conventions including street name, city, state, zip code, for US addresses, and conventions that are appropriate in the case of international addresses. In other embodiments, the sender information check for completeness may be performed by the server 930. In other embodiments, the server 930 may query another databased to perform a sender information check for completeness. In other embodiments, the sender registration information may undergo a deeper check at the one or more servers 930, such as being compared to public records for names and addresses. In some embodiments, the sender may receive a temporary account ID from the mail tracking system while the sender registration information is being verified. Once verified, the sender may be sent a permanent account ID. The permanent account ID may enable future use of the mail tracking system. In some embodiments, information, such as IP address and GPS location may continue to be collected each time a registered sender uses the mail tracking system.

In one embodiment, when preparing a mail item to be sent by a postal mail carrier, the sender may include his/her account ID for the mail tracking system with a return address. The account ID will be used by the central mail facility 200 for mail tracking of a mail item after being delivered by the postal mail carrier. The account ID informs the central mail facility 200 that the mail item will be tracked by the mail tracking system. In other embodiments, information that a mail item will be tracked by the mail tracking system may occur by way of associating the sender information on the return address with previously stored sender registration information. Similarly, the sender, when sending a digital communication, may include his or her account ID to enable the sender to track the status of the digital communication as it is processed by a central mail facility 200 or other entities.

In S2105, when postal mail is received and begins processing by the central mail facility 200, the incoming postal mail from a registered sender may be linked to the sender's account ID. Similarly, when a digital communication is received, the incoming digital communication from a registered sender may be linked to the sender's account ID. In some embodiments, in S2107, postal mail items are screened for physical contraband. If physical contraband is found, certain measures may be taken in accordance with policy and procedure of a correction facility 20. An entry may be made into the database management system 940 to indicate that physical contraband has been detected.

In some embodiments, the process may include obtaining a historical contraband search to determine whether the sender has previously sent a contraband and/or a prohibited communication. In one embodiment, a server 930 may perform historical contraband by searching the database management system 940 to determine if the sender has previously sent physical contraband. In such case, the server 930 may report patterns of repeated attempts to send contraband by the sender to correction facility administration or other authorities.

When processing physical mail and/or mail delivered via the postal mail system, any letter enclosed in the mail item may be separated from the envelope. In 10S2109, a scanner connected to a management console 500 may scan sender information in the return address of the envelope along with content information from the letter. In one embodiment, in S2111, the management console 500 may store the scanned results as image files in a storage of the management console 500, or may store image files in the database management system 940 in association with the sender. In one embodiment, the scanner may provide a notification to the server 930 if the scanned item or a portion thereof is comprised of an image (as opposed to a letter and/or other text matter). The image notification may be used for further processing as described further below. When processing digital communication, the process may be comprised of converting the file format of the digital communication. For example, a PDF file may be converted into a text file or an image file. A PNG attachment may be converted into a JPEG file format.

The process may include a content analysis step, which is described in greater detail below. The content analysis step may be comprised of a text recognition step, the sender identification step, metadata extraction step and/or a deep analysis step. In some embodiments, server 930 may process text within the scanned results from S2111 using optical character recognition (OCR). In other embodiments, other text recognition systems may be used to recognize the text in a communication, including, but not limited to machine learning systems, etc. In one embodiment of the invention, the process may be further comprised of a field matching step, wherein certain recognized text may be tagged with certain fields. For example, the recognized text may be stored in respective fields of the database for the database management system 940. Fields in the database may include sender name, sender street, sender city, sender state, sender zip code, and mail item content information.

The content analysis step may be further comprised of deep analysis. In some embodiments, the server 930 may perform a deep analysis based on the data in the database management system 940 to find indications of contraband. Contraband may be physical contraband such as drugs, biohazard materials, even weapons, which may be contained in the mail item received from the postal mail carrier 1905. However, contraband may also take the form of impermissible and/or criminal communications, such as solicitations from gangs or other criminal entities, communication with other gang members when the inmate is a member of a gang, and attempts to send instructions for conducting criminal activity by way of repeated messages from a same sender. The server 930 may mine the database management system 940 to look for patterns of criminal communications. In S2117, when contraband is detected by server 930, in S2119, server 930 may assign a contraband flag to the stored scanned result of S2111. In some embodiments, photographs may be considered as contraband. In S2117, contraband that is embedded or attached to a mail item, such as photographs, may be detected by server 930, and in S2119, server 930 may assign a flag to be stored in the database 940 as an indication that the mail contained embedded or attached contraband such as photographs. As described above, photographs may be marked as such by a scanner or by a server by applying intelligence to the digital media files associated with a communication, including, but not limited to, identifying the file type, identifying the size of the file, identifying the colors in a file, etc.

In some embodiments, server 930 may perform a deep analysis based on the data in the database management system 940 to find relationships among information stored for senders and inmates, including communications patterns among various senders and inmates, sender data that may have been collected when the sender registers for the mail-tracking system and/or sender data that may be collected when the sender logs into the mail-tracking system. For example, the server 930 may perform an analysis and a management console 500 may include a display that can show the results of the analysis such as all common senders associated with more than one inmate, or a sender that has sent more than one mail item to an inmate. Using information stored in the database management system 940 including the GPS location where the sender had performed initial registration, a GPS location where the status of a mail item was checked, and/or an IP address for the sender's device, an analysis may be performed by the server 930 to determine if there are common senders. Common senders may include senders that request status of mail items using a device(s) that has been assigned the same IP address. The management console 500 may display a list of sender names that shared the same IP address or the same physical location.

In one embodiment, the process may be comprised of additional update and/or a notification steps. In S2113, server 930 may match sender information from the return address with the inmate and may verify the inmate information. In S2115, the server 930 may operate the mail tracking system to generate a message indicating that the postal mail item has been received and send the generated message as a notification to the sender using a preferred method that the sender had previously indicated. In some embodiments, the message is generated by the server 930 and sent via an e-mail or text message service.

In S2121, when an inmate has an e-mail account, server 930 may associate the inmate e-mail with the scanned result of S2111 and/or the sender ID. In S2123, institution staff may use a management console 500 to review scanned results of inmates mail items, and in S2125, determine if access can be granted to an inmate based on policy rules and mail contents.

In a case that the correctional facility does not require mail to be reviewed by an agency before being delivered to the inmate via, kiosk, tablet, mobile device or being printed in copy paper form, then the mail will be delivered directly to the inmate and a notification email, or text is sent to the public sender notifying delivery.

In some embodiments, inmates may be organized by groups. For example, one group may be "inmates of interest." Inmates may be placed in this group by institutional staff, or may be placed in this group through previous detection of contraband, or due to certain flags. In some embodiments, unless an inmate is assigned to the special group "inmates of interest," mail may be sent straight through to the inmate without any review by institutional staff. In these embodiments, a much reduced quantity of mail will need to be reviewed by institutional staff in S2127.

In S2127, when institutional staff determines that access to content information of a mail item is rejected and if the correctional facility provides a reason for the rejection, in S2129, server 930 may send a notification message to the registered sender that includes the reason that the mail was rejected and the date and/or time of the rejection determination. In addition, in S2131, server 930 may log a date that the notification message was sent.

When institutional staff determines that access to content information of a mail item is accepted, in S2133, server 930 may send the scanned result of S2111 to an inmate accessible device, such as inmate kiosk 950 or portable device 960. This sending operation may be processed by server 930, which utilizes information stored in the database management system 940 to send information associated with the scanned result to addresses associated with kiosks 950 and portable devices 960 for the particular recipient inmate. At this point, in S2135, server 930 may send a registered sender a message that the postal mail item has been delivered to a location that is accessible directly by the recipient inmate. In S2137, server 930 may log the message indicating that postal mail has been delivered together with a date of the notification.

The public sender is provided access through their account ID to view, download or print all sent mail even if a mail item has been rejected.

Now referring to FIG. 20B, which illustrates a process for updating the mail-tracking system and sending notifications to a sender. In one embodiment, the management console 500 may display mail items that have been delivered as a list of mail item contents that are addressed to an inmate via an inmate ID. The list may include a status indicator, such as read or unread. The server may send the inmate a notice of mail delivery at the time that a mail item is delivered. The notice of mail delivery may be sent to a portable device 960 of the inmate, or provided to an alternative display device that can be viewed by inmates that do not have a portable device. In S2141, once a notice of delivery has been sent out by the server 930, a timer may be started to run for a predetermined period of time. For example, a timer may be set for a predetermined period of one day, or a certain number of hours. If the predetermined time period expires, in S2149, server 930 may send the registered sender a message that the mail item has not been read within the predetermined time period. In S2143, while the predetermined time period has not expired, server 930 checks whether the mail item content has been accessed by the recipient inmate. When the recipient inmate accesses the mail item content, in S2145, server 930 may send a notification message to the registered sender that the mail item has been read. In S2147, server 930 logs the date of sending the notification that the mail item has been read and may change the status of the mail item content to read. In one embodiment, the server 930 for the mail tracking system may continue to send notification messages to the registered sender each time the recipient inmate accesses the mail item content.

In one embodiment of the invention, if a sender associates his or her sender ID with a communication to an inmate (or if the system associates a sender ID with a communication), then the sender may be notified, via one or more digital messages, about the status of the sender's message. For example, if a sender's email address is available, the sender may be notified via email as the sender's message is routed within a mail tracking facility and/or a correctional facility. Exemplary notifications may include, but are not limited to when communication is assigned to an inmate where the sender information is entered, when the communication is received, when it is reviewed by a correctional facility (if required), and, if required, when their mail is printed for delivery at the facility.

System for Tracking Communication in a Correctional Facility

Figure 21:
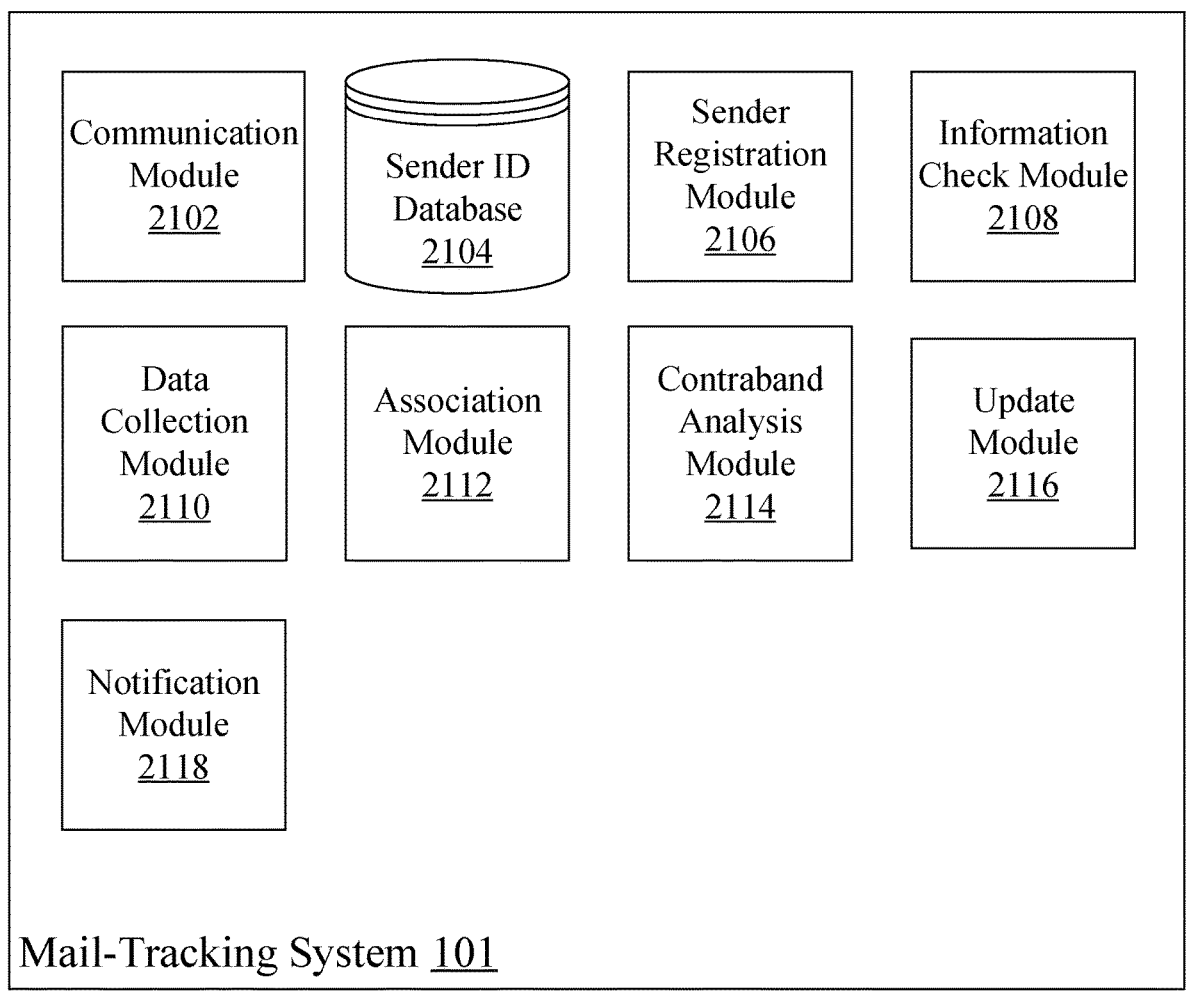
FIG. 21 illustrates components of the mail-tracking system in accordance with one embodiment of the invention.

FIG. 21 illustrates an exemplary embodiment of a mail-tracking system 110. The process described herein may be implemented in a system for tracking communication in a correctional facility and/or central mail facility 200 and/or a data center 100. The system may be comprised of a communication module 2102, sender ID database 2104, sender registration module 2106, information check module 2108, data collection module 2110, association module 2112, contraband analysis module 2114, update module 2116, and notification module 2118. However, the system may be reorganized or consolidated, as understood by a person of ordinary skill in the art, to perform the same tasks on one or more other servers or computing devices without departing from the scope of the invention.

The communication module 2102 communicates with other systems and devices. In one embodiment, the communication module obtains digital mail data that represents a communication from a sender to an inmate. The digital mail data may be obtained from a scanner or from another database.

The sender ID database 2104 tracks the various unique sender IDs that are generated. In one embodiment, the sender ID database 2104 may also log activity that is associated with the sender ID. For example, the sender ID database 2104 may log each communication that is sent to an inmate by the sender. Additional information about each communication may also be logged. In one embodiment, the sender ID database 2104 may be comprised of information that is supplied by a sender during the registration process, including the sender's name, address, phone number, email address, etc. The sender ID database 2104 may also include digital data associated with the device the sender has used at registration and/or when logging into the mail-tracking system, including, but not limited to device ID, IP address, location data of the device, etc.

The sender registration module 2106 enables a sender to register for the mail tracking system. In one embodiment the sender registration module 2106 queries the sender ID database to determine whether a sender is associated with a sender ID. If the sender is, then the sender information is passed to the sender ID database 2104 for further logging. If the sender is not associated with a sender ID, then the sender registration module may digitally prompt the user to initiate or complete his or her registration in accordance with the process outlined herein.

The information check module 2108 collects and completes a variety of information associated with the sender. In one embodiment, the information check module 2108 queries a database to ensure that the return address provided by the sender is complete. In one embodiment, the information check module 2108 may obtain the address completion check from an application executing on the sender's device, such as the sender's web browser.

In one embodiment, the association module 2112 associates the sender's ID with the digital mail data to ensure effective and efficient tracking.

The contraband analysis module 2114 determines whether there is digital contraband or impermissible communication in the digital mail data. The contraband analysis module 2114 may also interface with a manual reviewer's computing device to obtain information about whether a postal mail contains contraband. The contraband analysis module 2114 may use a variety of different methodologies to identify contraband, including the one presented herein. For example, the contraband analysis module 2114 may analyze the content of communication and may flag the communication as comprising impermissible and/or criminal communication if repetition and/or a pattern in communication from the sender to one or more inmates is identified. In another exemplary embodiment, the contraband analysis module 2114 identifies relationships between senders and inmates based on communications patterns among various senders and inmates, and/or collected sender data that is collected when the sender registers, and/or collected sender data that is collected when the sender logs into the mail-tracking system with credentials associated with the sender ID.

The data collection module 2110 collects data from the sender's computing device. The data collection module 2110 may obtain a variety of different data from the sender and/or from the sender's device. In one embodiment of the invention, the data collection module 2110 may obtain, for example, IP address from the sender's device, and/or from a communication gateway connected to the sender's device, location data, including, but not limited to GPS data, etc. In addition, the data collection module 2110 may obtain data provided by the sender, including the sender's name, address, phone number, email address, etc. In one embodiment, the data collection module 2110 obtains time-stamp data and activity data about the actions taken by the sender once the sender logs into the mail-tracking system 110. The data collected by the data collection module 2110 may be stored in the sender ID database 2104.

The update module 2116 updates the mail-tracking system 110 with relevant information obtained from various physical and digital touchpoints within the mail processing system, including, but not limited to central mail facility 200 and data center 100. In one embodiment, the update module 2116 updates the mail-tracking system 110 with information obtained from the delivery center/system, the inmate communication device used to display communication to an inmate, the contraband analysis module 2114 and/or the contraband analysis center or human reviewers, etc. The information updated by the update module 2116 may be pushed out to senders via a variety of communications method, which are known in the art, including push notification on an application on the sender's device, text messages, email messages, etc.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 22, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 22 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

In some embodiments, systems may be implemented on a distributed computing network, such as one having any number of clients and/or servers. Referring now to FIG. 23, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 23. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

FIG. 24 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer program product for tracking and compliance monitoring of communication that is sent to an inmate who is incarcerated in a correctional facility, the computer program product comprising a non-transitory computer readable storage medium having instructions encoded thereon that, when executed by a processor, cause the processor to:
obtain digital mail data associated with a communication sent to an inmate by a sender;
determine whether the sender is associated with a sender identification;
prompt the sender to register for a mail-tracking system if the sender is not associated with a sender identification, the mail-tracking system enabling the sender to receive updates regarding the communication;
obtain a sender information check, collect sender data, and associate the sender with a sender identification when the sender registers for the mail-tracking system, the sender information provided by the sender to register for the mail-tracking system;
obtain contraband analysis on the communication;
automatically flag the digital mail data if the obtained contraband analysis indicates that the communication is comprised of contraband;
update the mail-tracking system, wherein the sender is enabled to track the status of the communication by logging into the mail-tracking system with credentials associated with the sender identification; and
collect sender data when the sender logs into the mail-tracking system with credentials associated with the sender identification.

2. A computer-implemented method for tracking and compliance monitoring of communication that is sent to an inmate who is incarcerated in a correctional facility, the computer-implemented method comprising:
obtaining digital mail data associated with a communication sent to an inmate by a sender;
determining whether the sender is associated with a sender identification;
providing registration information to the sender if the sender is not associated with a sender identification, wherein the registration information enables a sender to register for a mail-tracking system and receive updates regarding the communication;
obtaining a sender information check when the sender registers for the mail-tracking system, the sender information provided by the sender to register for the mail-tracking system;
collecting sender data when the sender registers for the mail-tracking system;
generating sender identification that is associated with the sender once the sender has registered for the mail-tracking system;
associating the obtained digital mail data with the verified sender identification once it is made available;
obtaining contraband analysis on the communication;
automatically flagging the digital mail data if the obtained contraband analysis indicates that the communication is comprised of contraband;
updating the mail-tracking system, wherein the sender is enabled to track the status of the communication by logging into the mail-tracking system with credentials associated with the sender identification; and
collecting sender data when the sender logs into the mail-tracking system with credentials associated with the sender ID.

3. The computer-implemented method of claim 2, wherein digital mail data is comprised of one or more digital files representing physical communication.

4. The computer-implemented method of claim 2, wherein digital mail data is comprised of one or more digital files representing digital communication.

5. The computer-implemented method of claim 3, wherein physical communication is comprised of communication sent via postal mail.

6. The computer-implemented method of claim 2, further comprising electronically storing digital mail data.

7. The computer-implemented method of claim 2, wherein collecting sender data, when the sender registers for the mail-tracking system, is comprised of collecting an IP address associated with the computing device used by the sender.

8. The computer-implemented method of claim 2, wherein collecting sender data, when the sender registers for the mail-tracking system, is comprised of obtaining location data associated with the computing device used by the sender.

9. The computer-implemented method of claim 2, wherein collecting sender data, when the sender registers for the mail-tracking system, is comprised storing a tracking code on the computing device used by the sender.

10. The computer-implemented method of claim 2, wherein obtaining a sender information check when the sender registers for the mail-tracking system, is comprised of obtaining a local check from an application on the computing device used by the sender, wherein the local check is performed to detect completeness of the sender provided address and to ensure compliance with convention.

11. The computer-implemented method of claim 2, wherein obtaining a sender information check, when the sender registers for the mail-tracking system, is comprised of verifying the sender provided information against information obtained from other databases.

12. The computer-implemented method of claim 2, further comprising obtaining a determination of whether the sender identification associated with the digital mail data is associated with sending contraband to an inmate.

13. The computer-implemented method of claim 2, further comprising analyzing the content of the digital mail data.

14. The computer-implemented method of claim 2, further comprising identifying repetition or a pattern or both in communication from the sender to one or more inmates, the repetition or pattern or both indicating that the communication is comprised of impermissible or criminal communication or both.

15. The computer-implemented method of claim 13, wherein contraband analysis is further comprised of identifying certain keywords in the content of the communication between the sender and the inmate.

16. The computer-implemented method of claim 2, further comprising: identifying relationships between senders and inmates, the relationships selected from the group consisting of based on communications patterns among various senders and inmates, collected sender data that is collected when the sender registers, collected sender data that is collected when the sender logs into the mail-tracking system with credentials associated with the sender identification, and combinations thereof.

17. The computer-implemented method of claim 2, wherein the mail-tracking system is updated when the digital mail data is made available to the inmate.

18. The computer-implemented method of claim 2, wherein the sender is notified when the digital mail data representing communication sent by the sender is made available to the inmate.

* * * * *